INVENTOR
A.E. JOEL, JR.
BY
C. Mathie
ATTORNEY

Nov. 30, 1954   A. E. JOEL, JR   2,695,928
CALLING LINE IDENTIFICATION
Filed July 14, 1951   15 Sheets-Sheet 7

INVENTOR
A.E. JOEL, JR.
BY C. Mathis
ATTORNEY

Nov. 30, 1954   A. E. JOEL, JR   2,695,928
CALLING LINE IDENTIFICATION
Filed July 14, 1951   15 Sheets-Sheet 8

INVENTOR
A.E. JOEL, JR.
BY
C. Mathie
ATTORNEY

INVENTOR
A. E. JOEL, JR.
BY
ATTORNEY.

Nov. 30, 1954  A. E. JOEL, JR  2,695,928
CALLING LINE IDENTIFICATION
Filed July 14, 1951  15 Sheets-Sheet 12

INVENTOR
A.E. JOEL, JR.
BY
C. Matrice
ATTORNEY

Nov. 30, 1954  A. E. JOEL, JR  2,695,928
CALLING LINE IDENTIFICATION
Filed July 14, 1951  15 Sheets-Sheet 14

INVENTOR
A.E. JOEL, JR.
BY
C. Mathie
ATTORNEY

INVENTOR
A.E. JOEL, JR.
BY
C. Mattice
ATTORNEY

# United States Patent Office 2,695,928
Patented Nov. 30, 1954

2,695,928

CALLING LINE IDENTIFICATION

Amos E. Joel, Jr., South Orange, N. J., assignor to Bell Telephone Laboratories, Incorporated, New York, N. Y., a corporation of New York Application July 14, 1951, Serial No. 236,717

12 Claims. (Cl. 179—18)

This invention relates to dial telephone systems and has for its object to facilitate the identification of calling lines for charging purposes.

In the cross-bar dial system, lines are assigned to the switch terminals without regard to their designation, but the sleeve conductors of such lines are cross-connected to terminals on an auxiliary frame, known as a number group frame, which are individual to the designation, these terminals being used by the common control equipment to test whether the line is busy or idle.

My Patent No. 2,490,441, granted December 6, 1949, is directed to means for using the number group frame to identify a calling line for charging purposes. In that patent, the sender picks an idle identifier and special means is provided by which the selected identifier may determine the number group in which the calling line appears.

In accordance with the present invention, any one of a plurality of senders starts all of a plurality of identifiers simultaneously, each identifier starting the hunt for the calling line in a different number group circuit. When one identifier finds the line, it identifies the sender which originated the identification operation, after which all of the other identifiers are returned to normal.

In addition, means is provided to identify not only the line but the party on that line, by means of a characteristic tone. More specifically, means associated with the sleeve terminal on the number group frame is used to render the identifier responsive only to the proper party tone.

According to another feature of the invention, the identifier is enabled to identify the sender which is the source of the line identifying tone by transmitting a tone back over the sleeve of the identified line.

These and other features of the invention will be more clearly understood from a consideration of the following description, read in connection with the drawings, in which.

Figure 6:
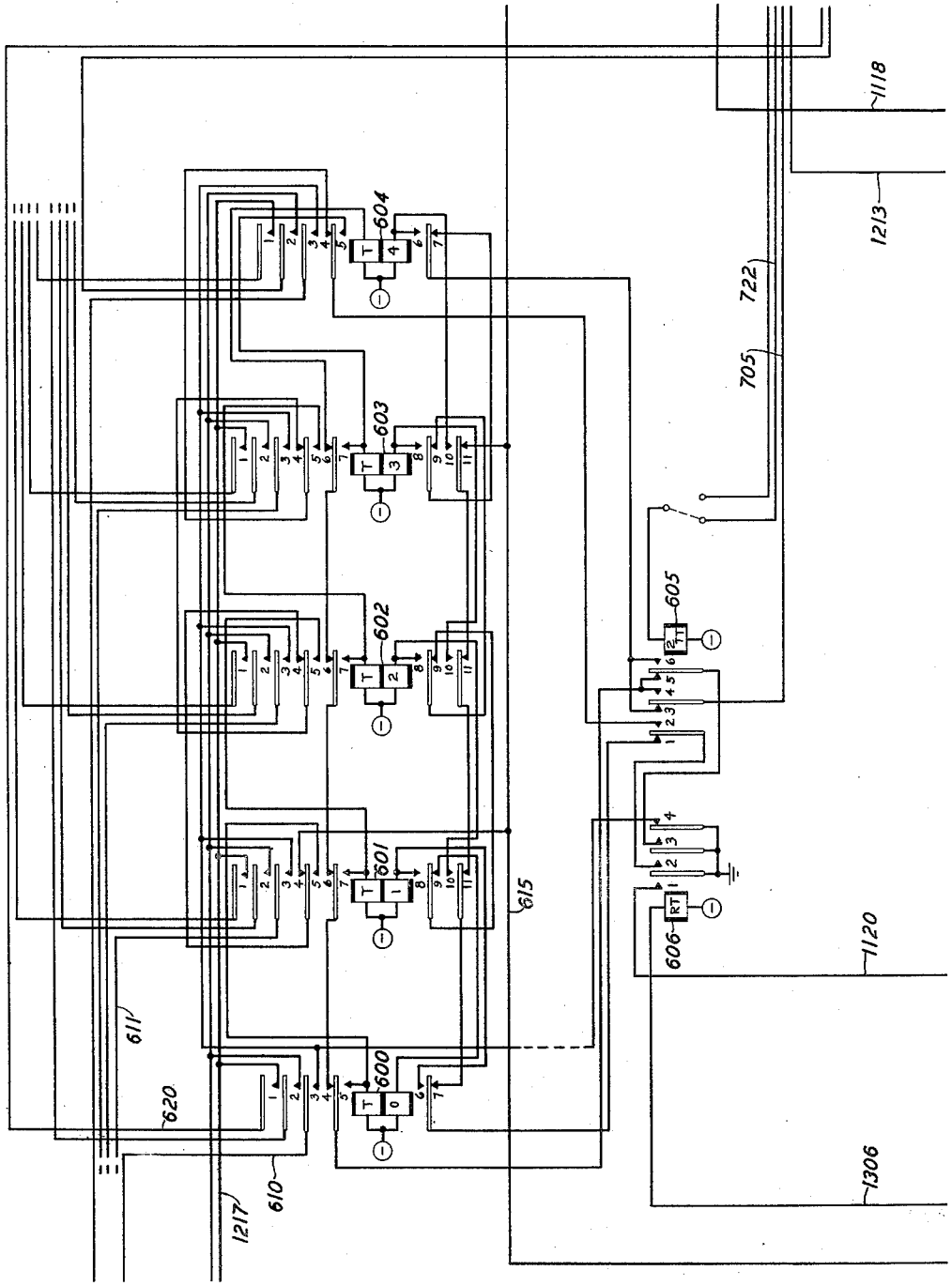
Figs. 6, 7 and 11 to 15 show one of a plurality of identifiers.
Figure 7:
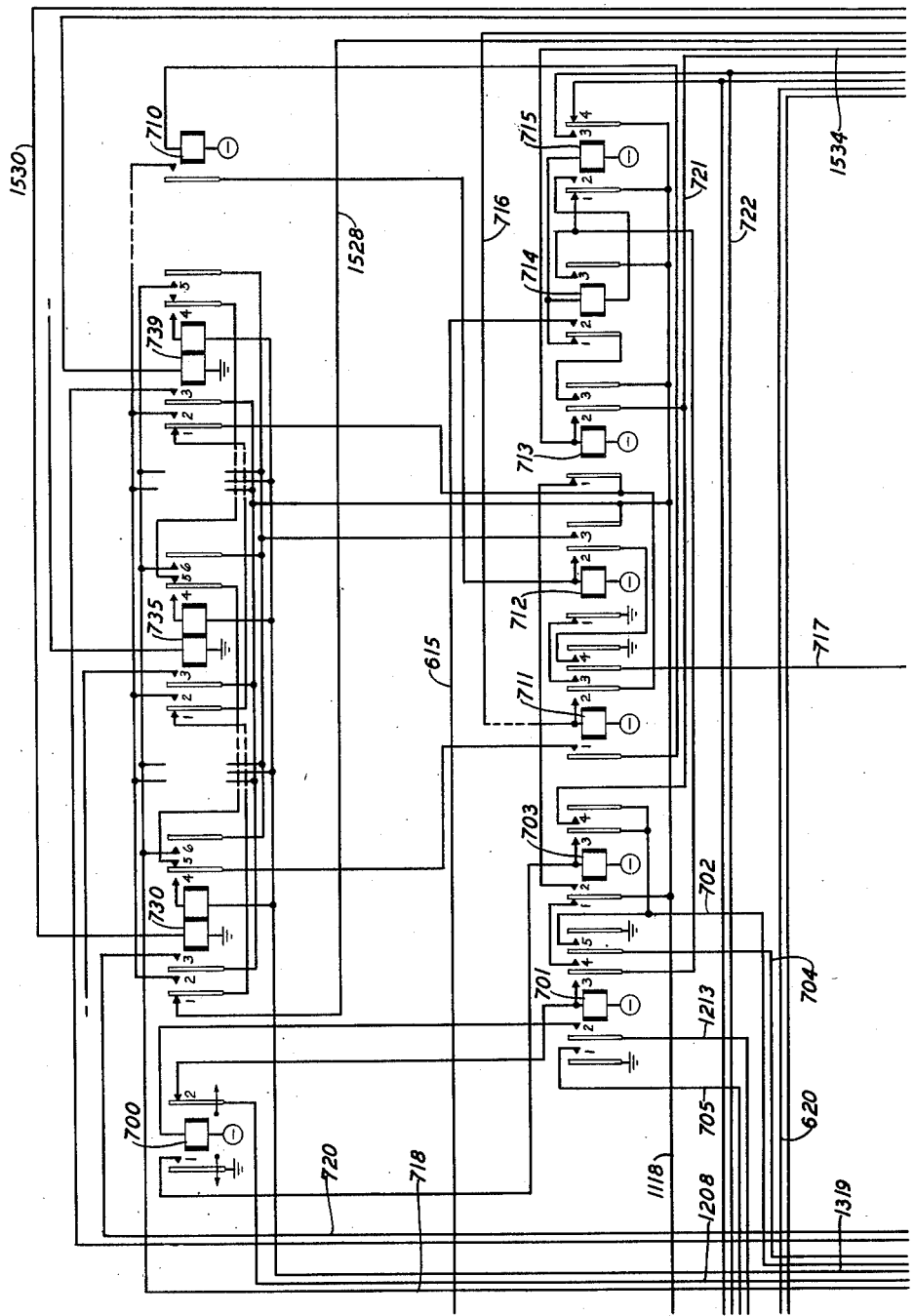
Figure 8:
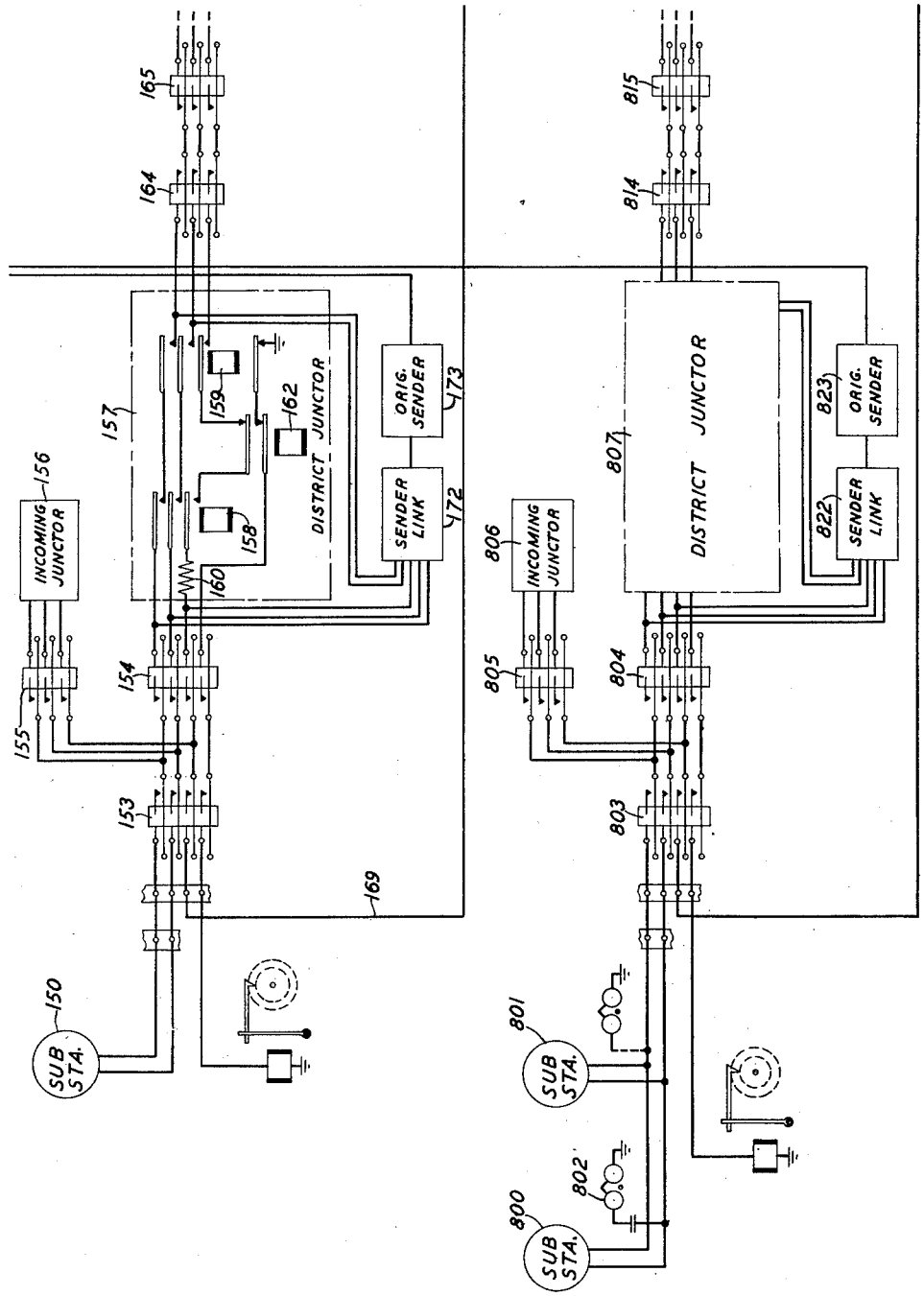
Figure 9:
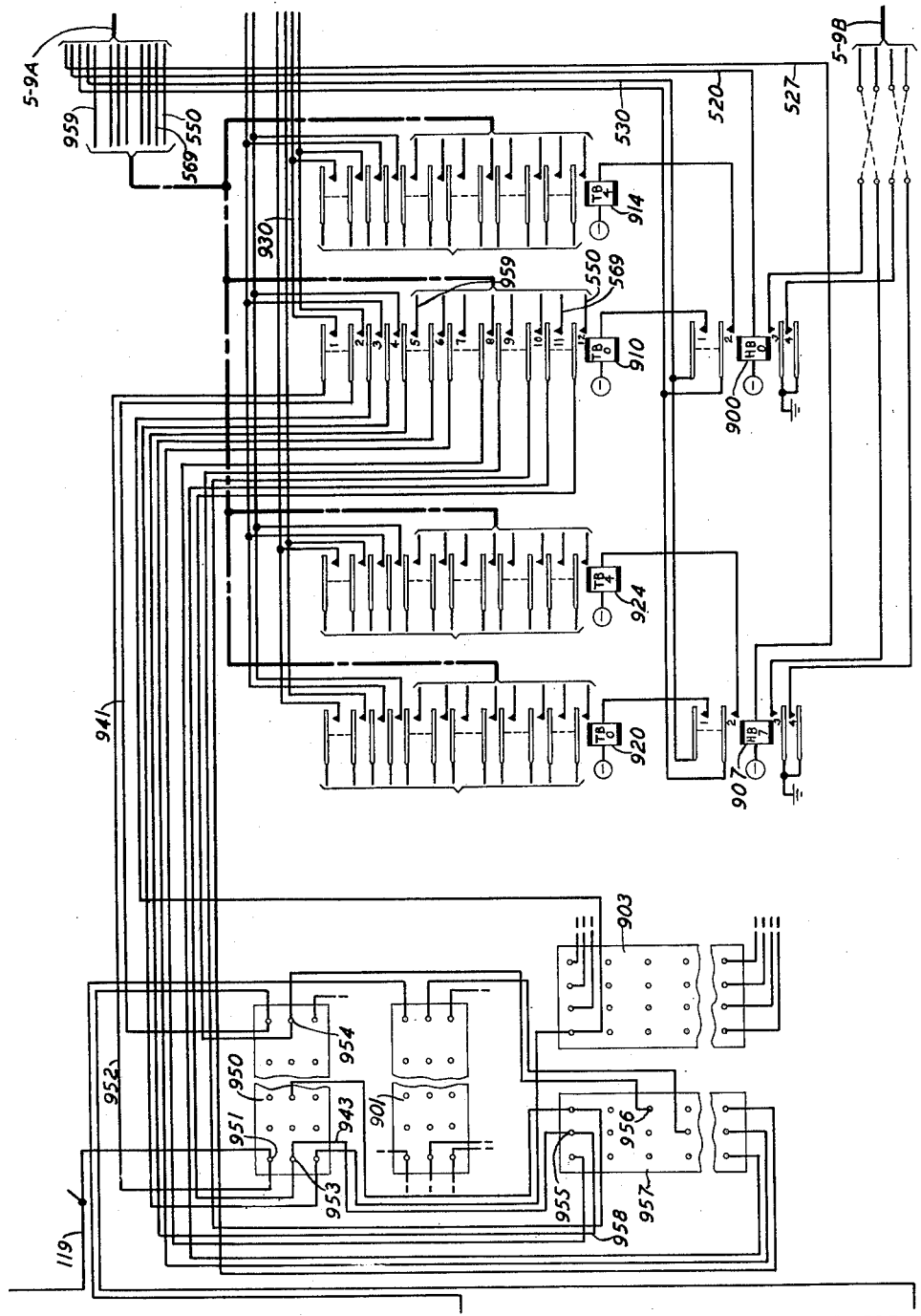
Figure 10:
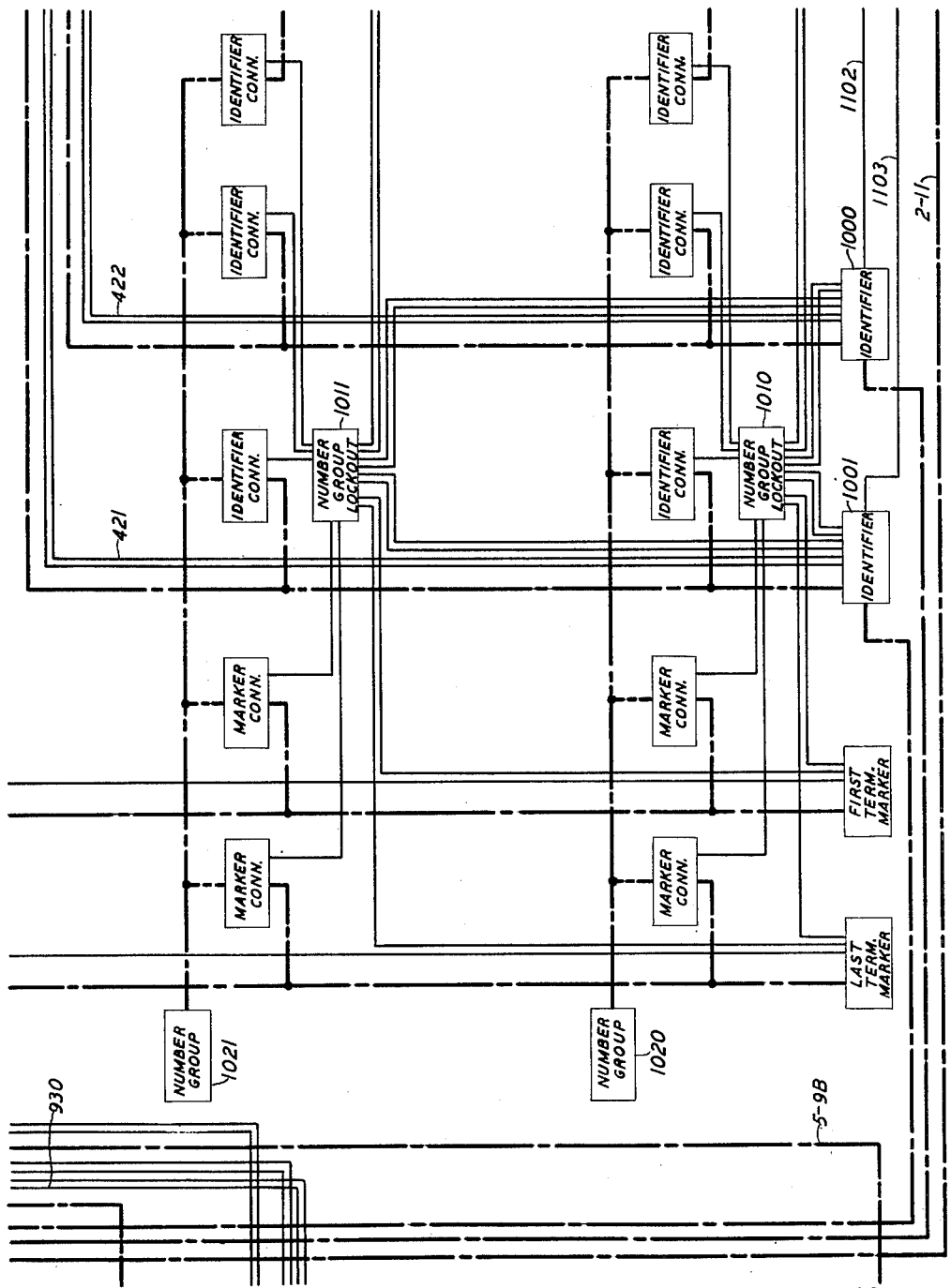
Figure 11:
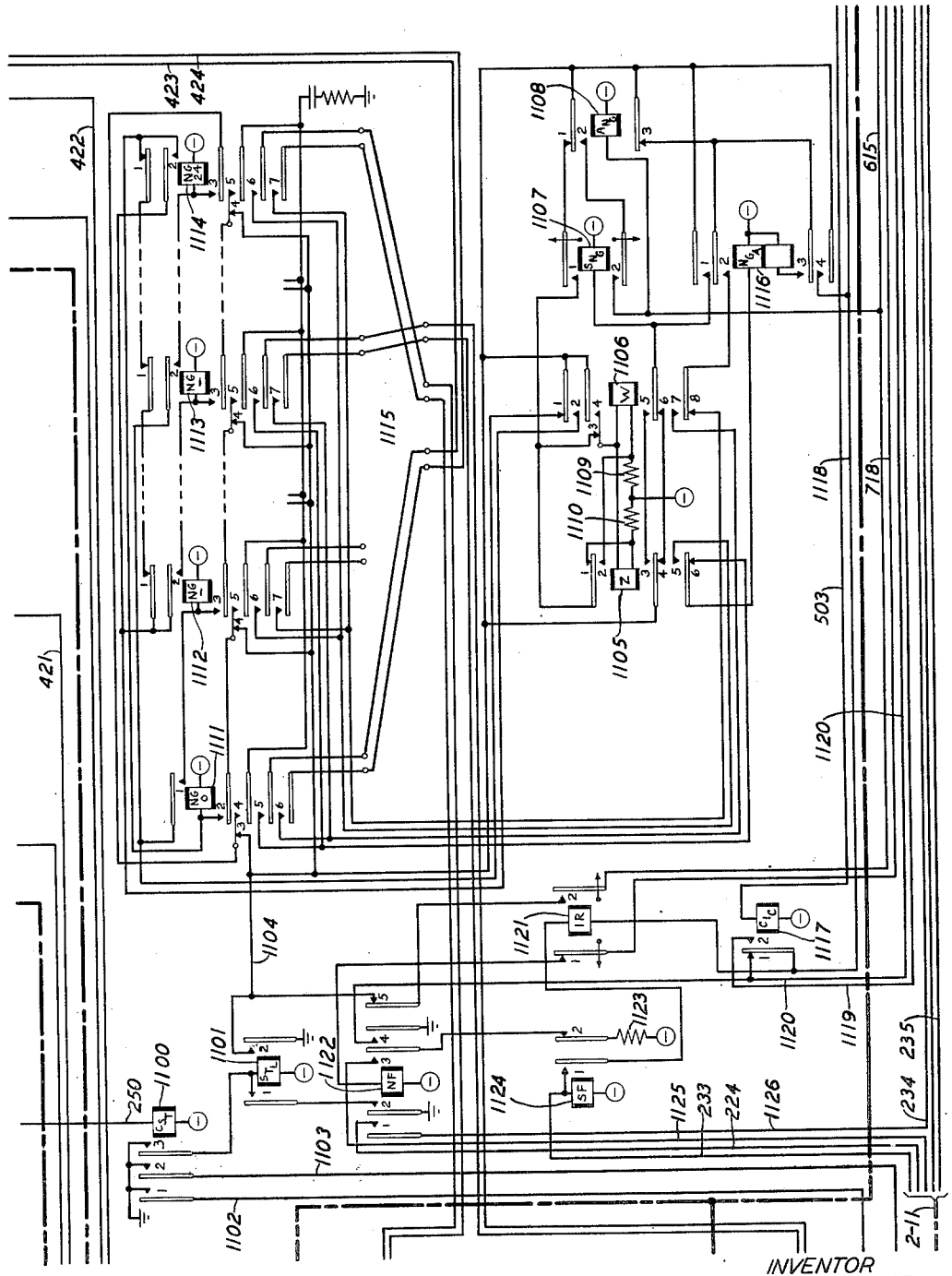
Figure 12:
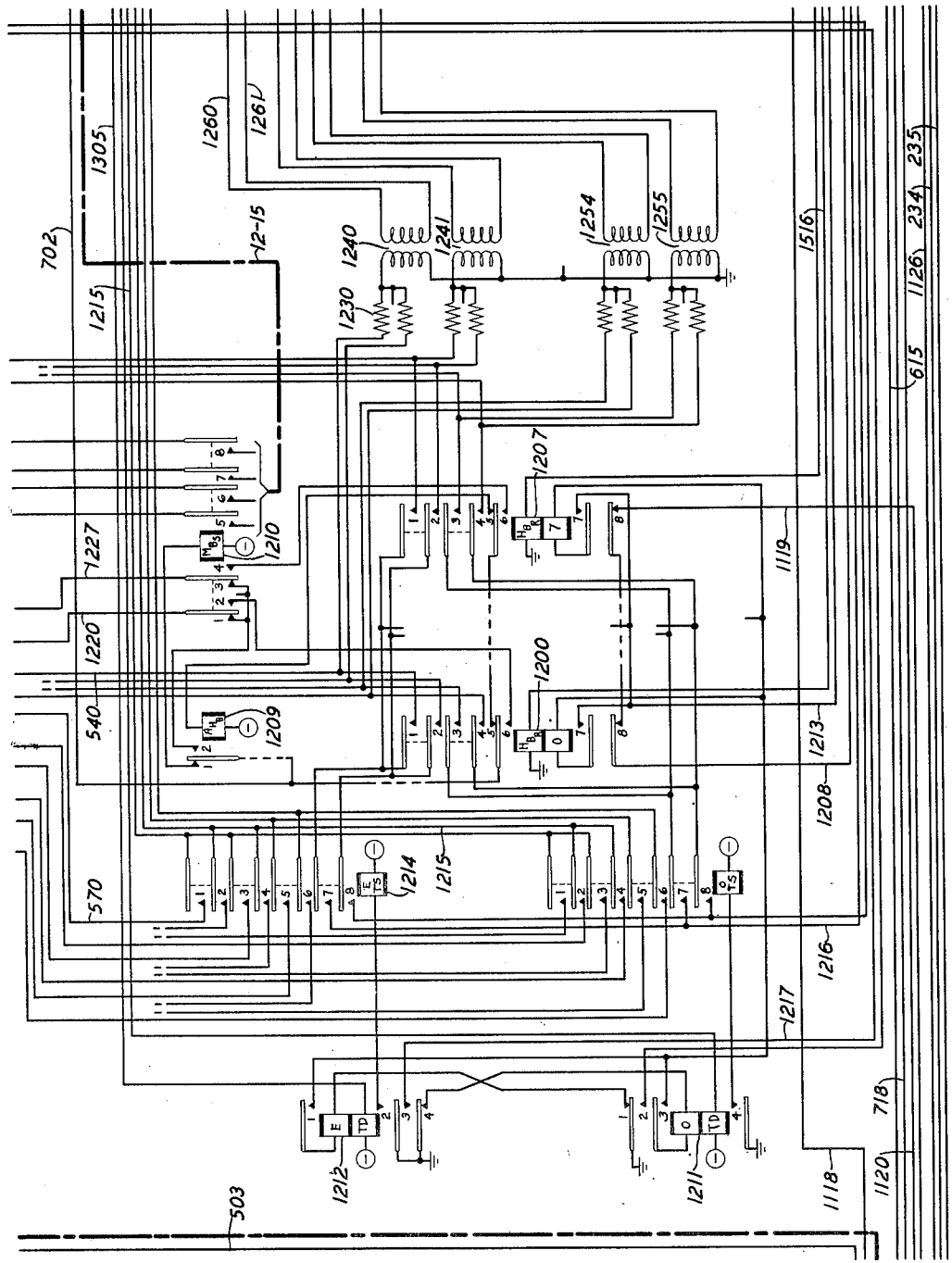
Figure 13:
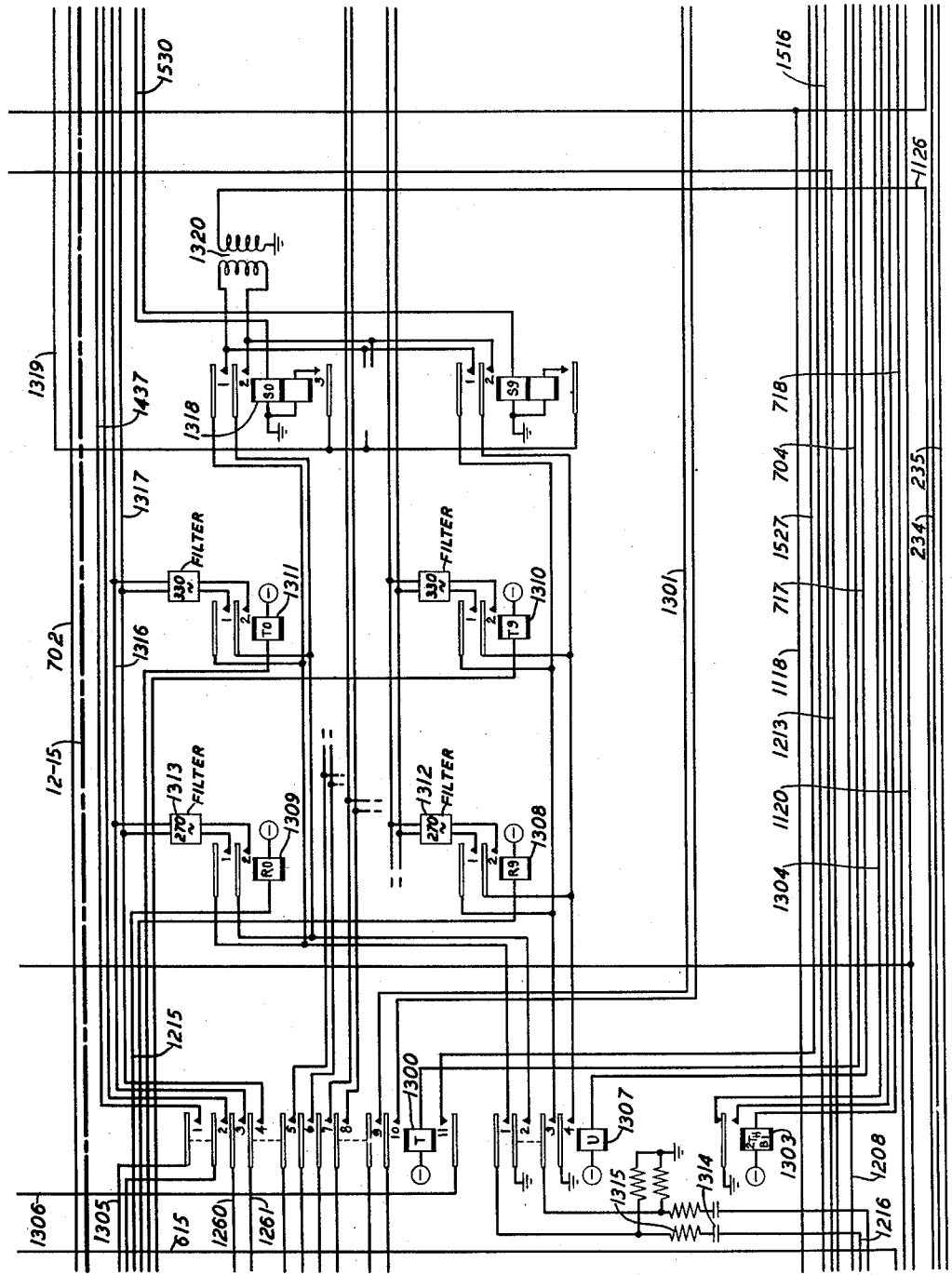
Figure 14:
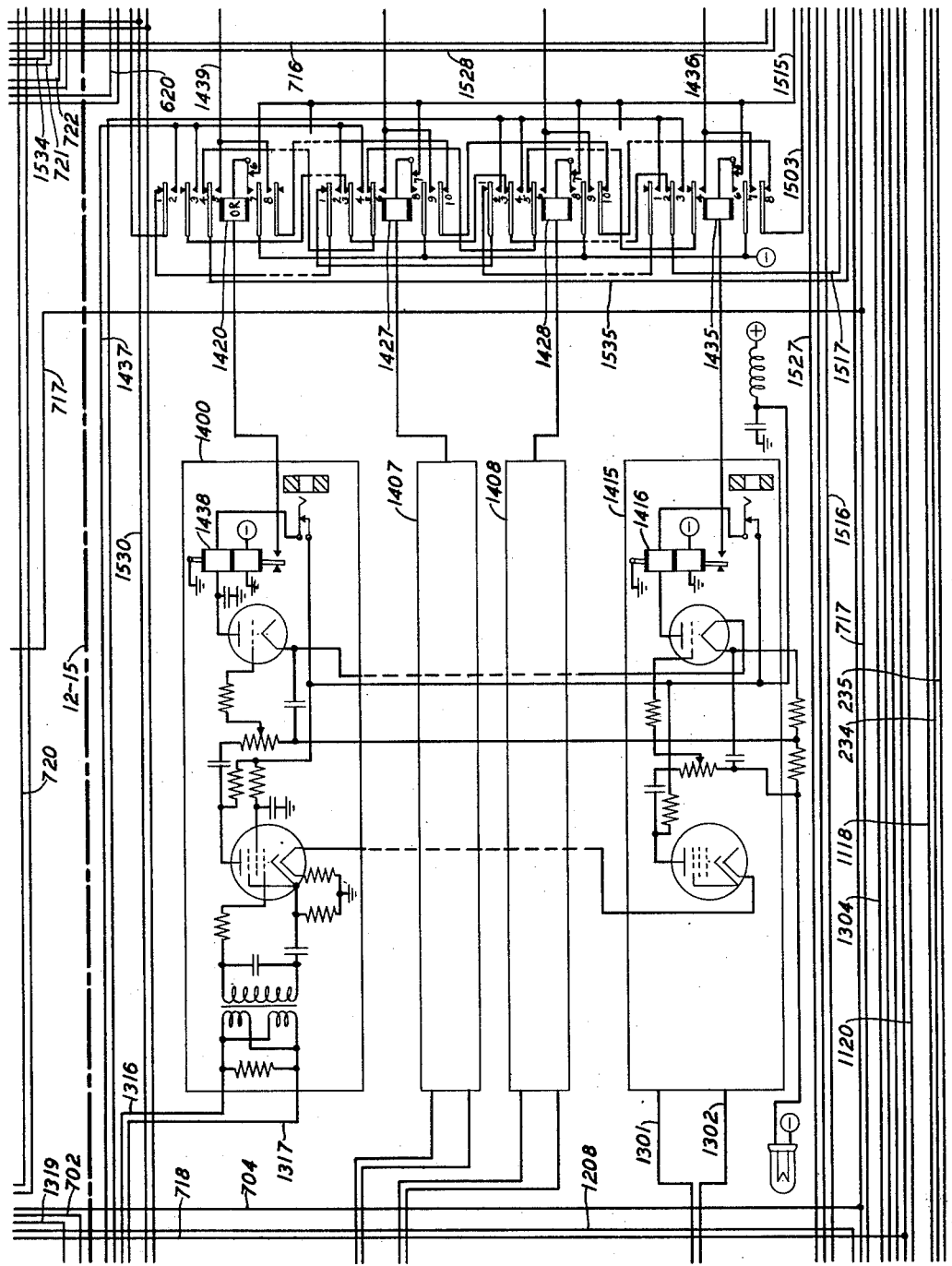
Figure 15:
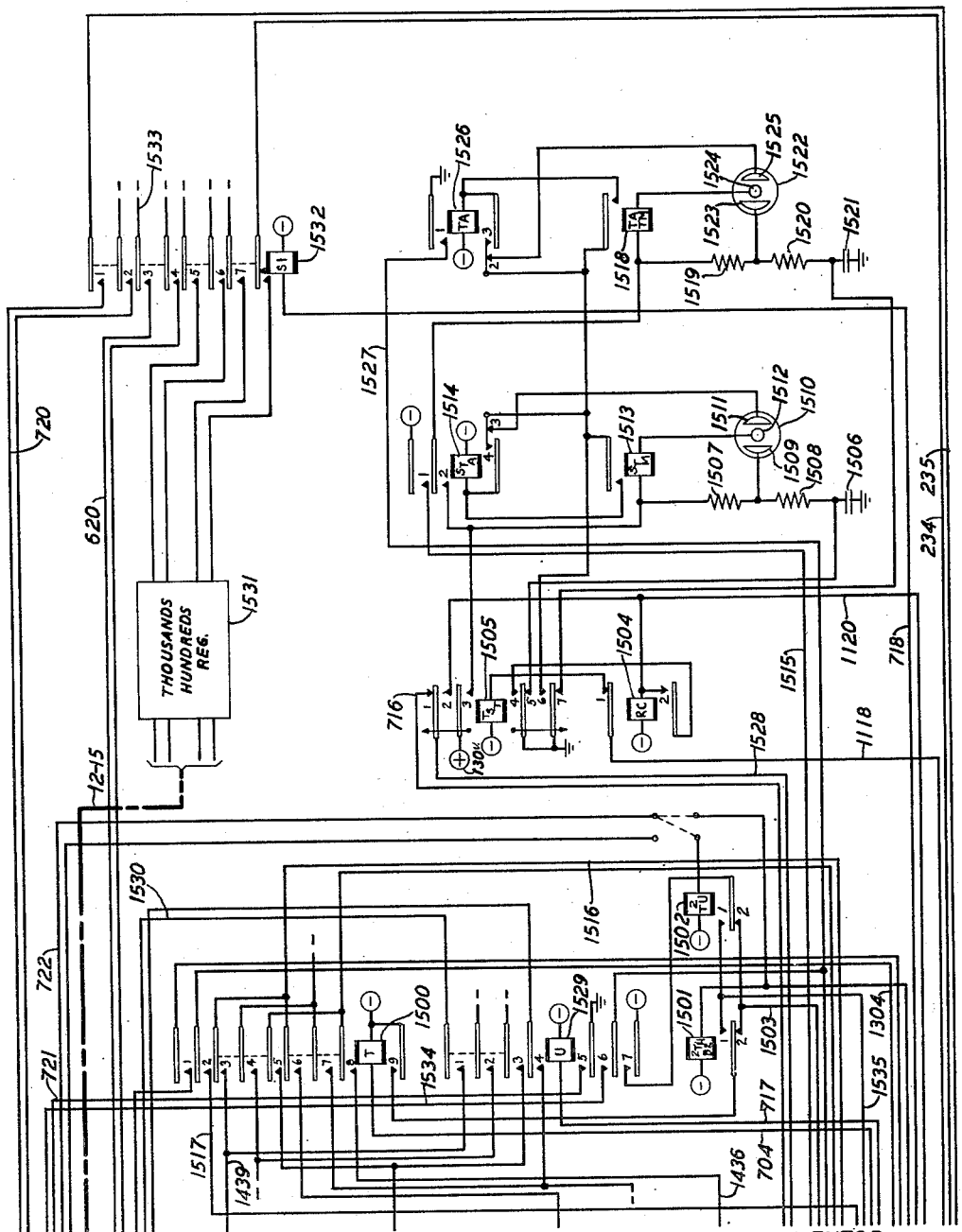

Fig. 6 showing the twenty-block progress circuit;
Fig. 7 showing the units identification control circuit;
Fig. 11 showing the number group selection circuit;
Fig. 12 showing the hundred-block register relays;
Fig. 13 showing the detector input connector relays;
Fig. 14 showing the detector and output relays;
Fig. 15 showing the detector output connector relays;
Fig. 9 shows one of a plurality of number group frame circuits;

Fig. 10 shows in schematic form a plurality of markers, identifiers, number groups and connectors; and Fig. 16 shows the manner in which the other figures should be arranged.

Figure 1:
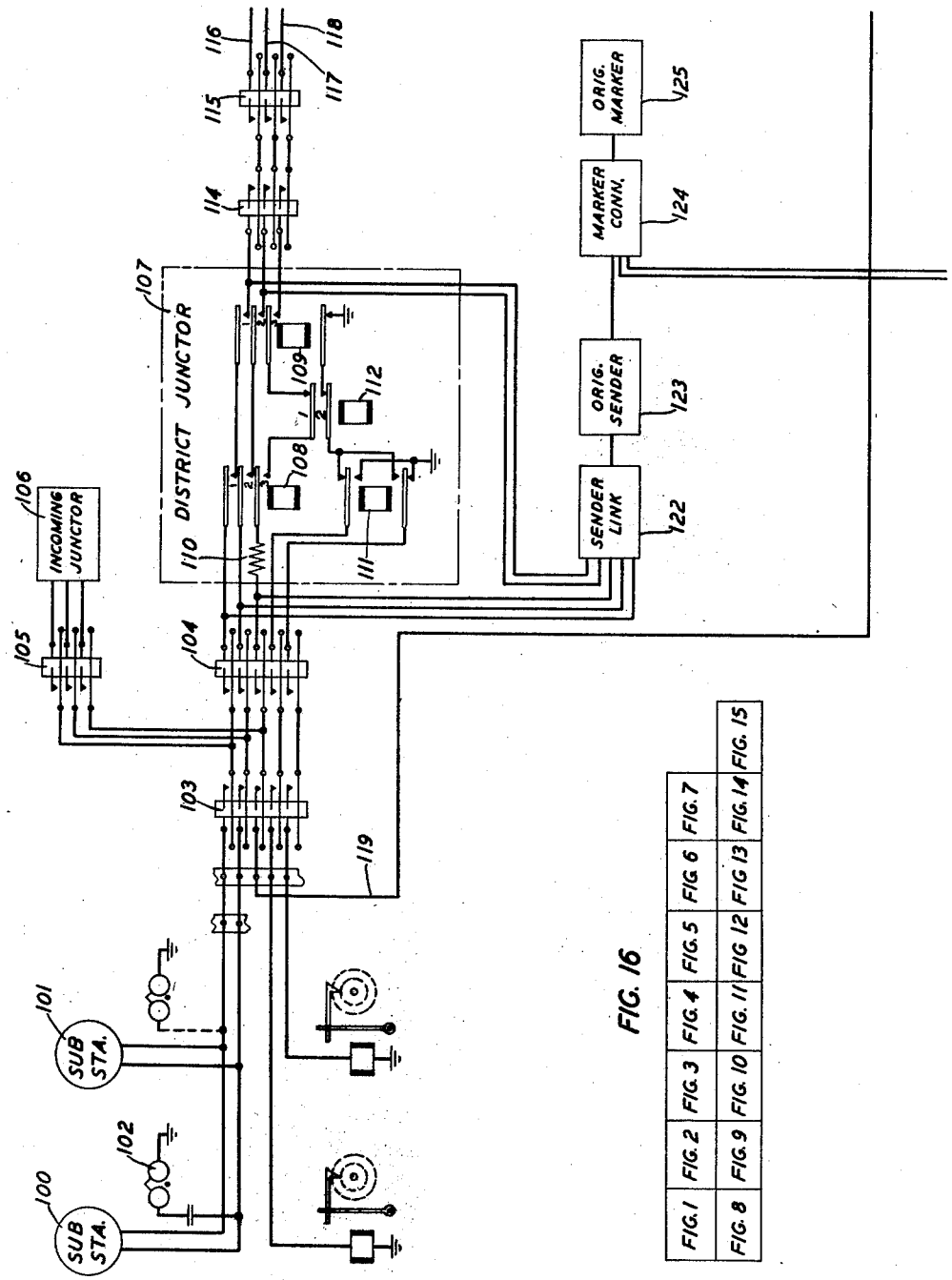
Figs. 1 and 8 show three subscribers' lines, together with the switches and district junctors over which outgoing calls are extended.
Figure 2:
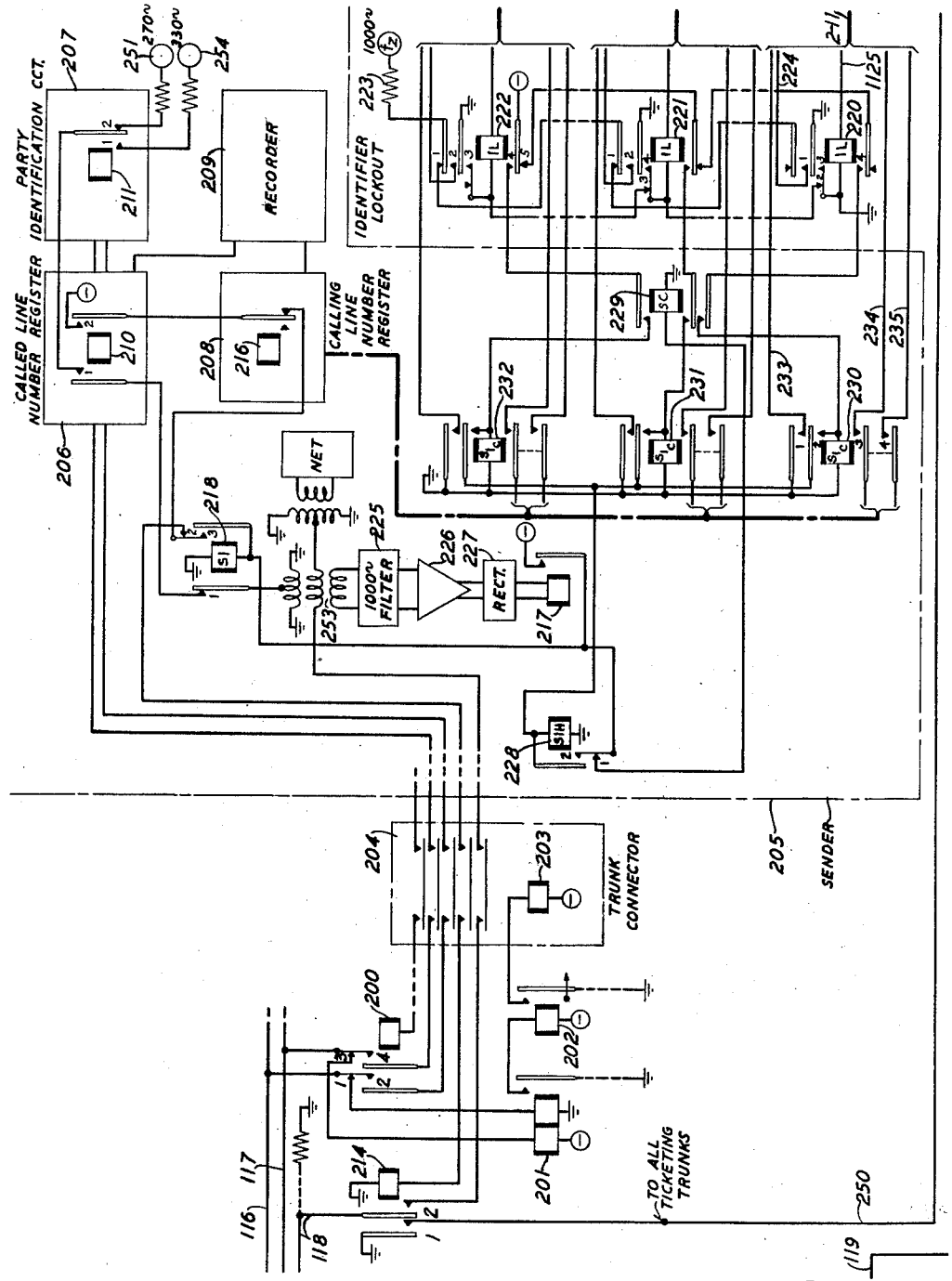
Fig. 2 shows in schematic form an outgoing trunk, a trunk connector, an associated sender, the tone equipment and the identifier lock-out circuit.

This line identifying arrangement may be used in place of the identifier shown in Patent 2,629,016 granted to J. W. Gooderham, February 17, 1953, and reference may be made to that patent for typical operating circuits for the relays of the trunk and sender of Fig. 2. A typical cross-bar system is shown in Patent 2,235,803 to W. W. Carpenter, March 18, 1941, and reference is made to that disclosure for the operation of relays of the district junctor of Fig. 1.

Briefly, when a calling subscriber initiates a toll call, the line is extended to a trunk outgoing to the toll office and an outgoing sender is attached to the trunk to control the apparatus at the distant office and to transmit thereto the number of the called line. This sender also includes a calling line register and a recorder or ticketer which records the details of the call for charging purposes. When the sender has received the called number, and has determined whether or not the call was originated by the tip party on the calling line, it connects a characteristic tone to the sleeve conductor of the connection, over which the tone is extended to a sleeve terminal individual to the line designation at a number group frame. In the case of party lines, a plurality of terminals are marked.

At the same time a common start relay is operated which operates the individual start relays in all of the line identifiers. Each identifier is arranged to start hunting for the identification tone in a different number group so that a minimum time is required to find the marked terminal.

Each number group includes a maximum of 800 number terminals and an identifier tests the terminals in groups of 160 so that a maximum of five testing operations determines whether the marked terminal is located in a particular number group. If the terminal is within the number group, the identifier registers the thousands, hundreds and tens digit and then proceeds to determine the units digit. By means of the party characteristic of the tone, the identifier is enabled during the units test to determine whether it has found the terminal of the correct party.

As soon as one identifier has found the marked terminal it determines the sender which originated the marking tone, connects therewith and transfers the designation to that sender. For this purpose it operates a relay in an identifier lock-out chain and transmits a tone of a different frequency back over the tested sleeve terminal and circuit to the sender, to operate a relay individual to that sender. Under the joint control of the identifier lock-out relay and the sender relay, a connector relay is operated over contacts of which the designation as set up in the identifier is transferred to the calling number register of the sender, after which the identifier is released.

As soon as the sender has been identified and the sender relay operated, the common start relay is released and the other identifiers are returned to normal.

Detailed description

When the subscriber at substation 100 wishes to make a toll call, he removes his receiver from the switchhook, thereby initiating a series of operations resulting in the connection of his line with an idle district junctor such as junctor 107 over primary line switch 103 and secondary line switch 104 and with an idle originating sender 123 over a sender link 122. He then dials the number of the wanted line, which is registered in the originating sender 123. The sender 123 connects with an idle originating marker 125 through the marker connector 124 and transmits the designation of the wanted office to the marker, which functions to connect the district junctor 107 through a set of switches, represented by switches 114 and 115 to a trunk outgoing to the toll office. When this connection has been established, a circuit is closed from battery through the left winding of the trunk line relay 201, contact 3 of relay 200, ring conductor 117 of the trunk, through the switches 115 and 114 and sender link 122 to a bridge established in the sender and back to tip conductor 116, contact 1 of relay 200, right winding of relay 201 to ground. Relay 201 operates, operating relay 202 which in turn operates the start relay 203 of the trunk connector 204 which serves to connect the trunk with an idle outgoing sender 205. This sender includes a called line number register 206, which serves to control the extension of the call to the called line, a party identification circuit 207 for indicating when the tip party of a two-party line is calling, a calling line number register 208 and a recorder or ticketer 209 for recording the details of the call for charging purposes.

When the sender has been attached to the trunk, relay 200 is operated to transfer the tip and ring conductors from relay 201 to the sender 205, after which the originating sender 123 transmits the called line designation to the called line number register 206. When the designation has been received, relay 210 operates to start the operation of the line identifiers. The sender proceeds to control the completion of the connection in the appropriate manner.

When the control equipment at the originating office has completed its functions, relays 108 and 109 are operated in the district junctor 107 and the calling line is connected through to the sender 205, where the party identification circuit 207 functions to test whether or not the calling substation is a tip party on a party line. Assuming that the substation 100 is the ring party, the line will not be grounded and relay 211 remains unoperated.

Relay 210, when operated as above described, closes a circuit from battery over its contact 2, normally closed contact of relay 216, contact 2 of relay 218 through the trunk connector 204 to ground through the winding of relay 214. Relay 214 connects ground over its contact 1 to start conductor 250, which is common to all ticketing trunks, to battery through the winding of the common start relay 1100.

Relay 214 also connects the identification tone to the sleeve conductor of the trunk. Since it has been assumed that a ring party is calling and relay 211 is not operated, the source 251 of 270-cycle alternating-current characteristic of the ring party is connected over contact 2 of relay 211, contact 1 of relay 210, contact 1 of relay 218, to the upper winding of hybrid coil 253. Current is induced in the middle winding of hybrid coil 253 and passes through the trunk connector 204, contact 2 of relay 214, sleeve conductor 118 of the trunk, through switches 115 and 114, contact 3 of relay 109, contact 1 of relay 112, contact 3 of relay 108, resistance 110, through line switches 104 and 103, conductor 119 to cross-connecting terminal 951, individual to the calling line at the number group frame 950.

Common start relay 1100, when operated, connects ground to the individual start relays of all identifiers. At its contact 3, relay 1100 closes an obvious circuit for the start relay 1101 individual to the identifer shown in detail, while at its contacts 1 and 2 relay 1100 connects ground to conductors 1102 and 1103 leading to the individual start relays of identifiers 1000 and 1001. As many identifiers are provided as are required by the traffic.

Relay 1101 closes a circuit from ground over its contact 2, conductor 1104, contact 4 of relay 1105, contact 6 of relay 1106, to battery through the winding of relay 1107 to start the selection of a number group. Relay 1107 operates and closes a circuit from ground on conductor 1104, contact 1 of relay 1108, contact 1 of relay 1107, contact 3 and winding of relay 1106, to battery through resistance 1109. Relay 1106 operates and locks over its contact 4 to ground on conductor 1104. A circuit is closed from battery through resistance 1110, winding of relay 1105 over contact 4 of relay 1106 to ground on conductor 1104, but relay 1105 cannot operate, since ground on conductor 1104 is connected over contact 1 of relay 1108, contact 1 of relay 1107 and contact 1 of relay 1105 to resistance 1110 in shunt of the winding of relay 1105.

With relay 1106 operated, a circuit is closed from ground on conductor 1104, contact 2 of relay 1106, contacts 1 of relays 1112, 1113, 1114 and the intermediate relays to battery, through the winding of relay 1111. Relay 1111 operates in this circuit and locks over its contact 2 and contact 4 of relay 1112 to ground on conductor 1104.

Relays 1111 to 1114 constitute a number group walking or progress circuit. One such relay will be provided for each number group and the relays are operated in succession to determine the order in which the identifier will seize the number groups to hunt for the calling line. A set of cross-connecting terminals 1115 is provided so that each identifier will be arranged to start searching at a different number group frame. Each of the relays 1111 to 1114 closes two circuits leading to the number group lockout, or preference circuit associated with the corresponding number group circuit. With the cross-connections as shown, relay 1111 closes circuits leading to the number group preference circuit shown in detail, while relay 1113 is arranged to close corresponding circuits leading to the number group lock-out circuit 1010 associated with number group 1020. Relay 1114 is arranged to close corresponding circuits leading to number group lock-out circuit 1011 associated with number group 1021.

In identifiers 1000 and 1001 the cross-connections such as 1115, would be so arranged that different number groups would be the first to be seized, for example identifier 1000 would search first in number group 1020 and identifier 1001 would search first in number group 1021.

Figure 3:
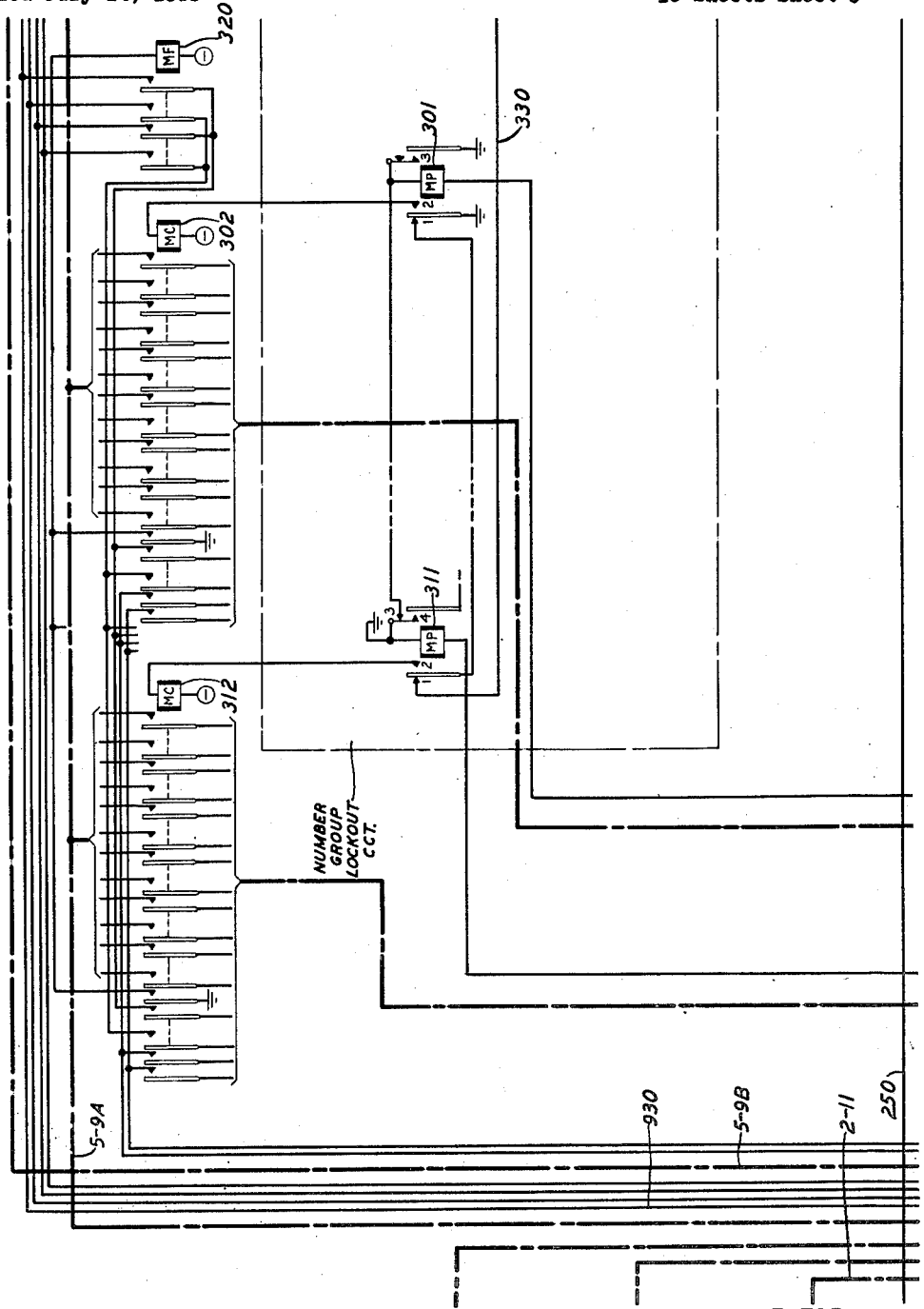
Fig. 3 shows the marker number group multicontact connector relays.
Figure 4:
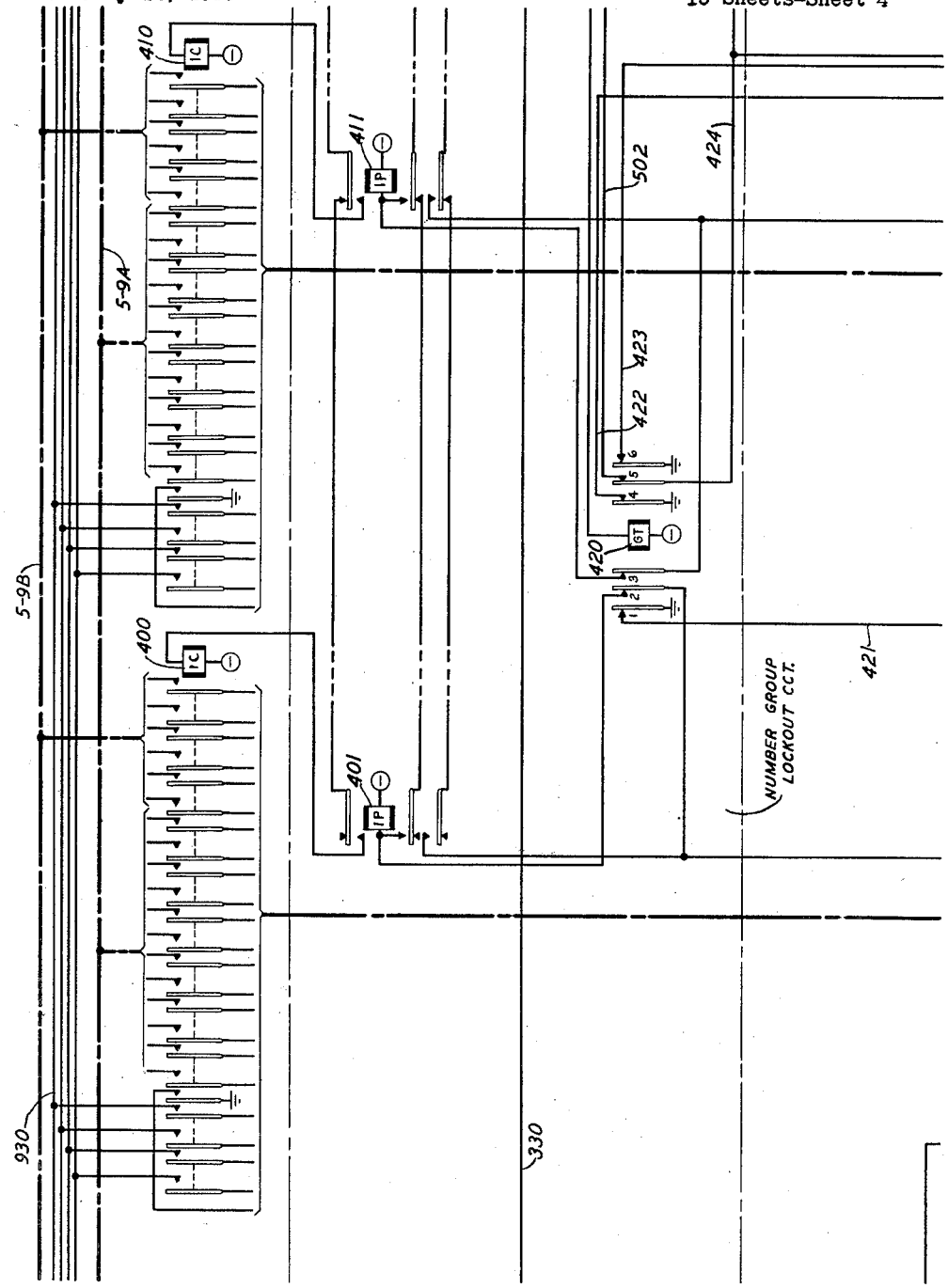
Figs. 4 and 5 show the identifier number group multi-contact connector relays.
Figure 5:
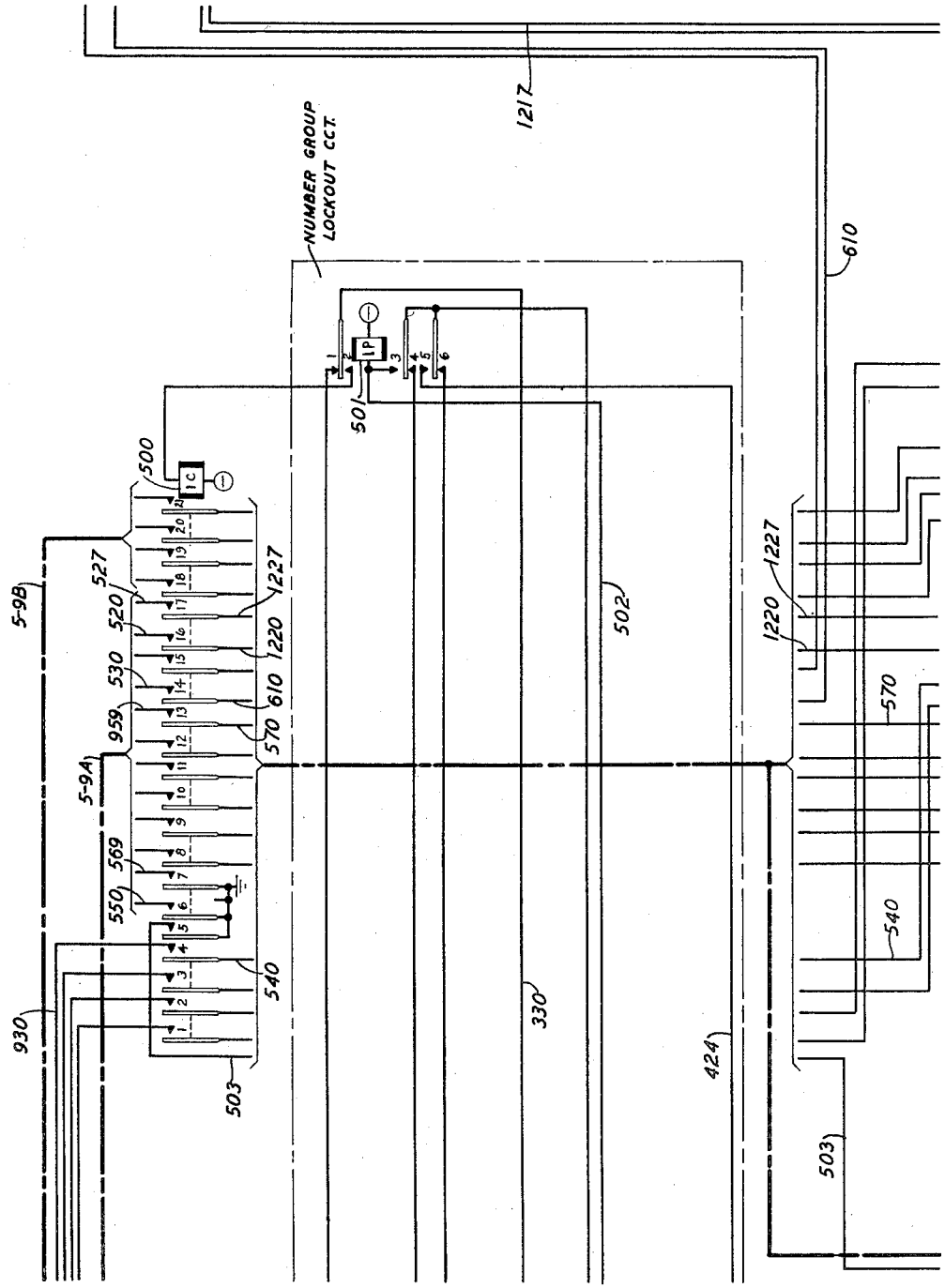

The number group lock-out or preference circuit shown in Figs. 3, 4 and 5 includes one preference relay such as relays 301 and 311 for each marker and one preference relay such as relays 401, 411 and 501 for each identifier and a gate relay 420. Whenever an identifier is attempting to search in this number group, the gate relay 420 is operated as will be described. Assuming that no other identifier has seized the number group shown in detail, relay 420 will be normal and ground will be connected to conductors 421, 422 and 423 leading to the three identifiers.

Ground on conductor 423 completes a circuit over contact 5 of relay 1111, contact 6 of relay 1105, upper winding of relay 1116 to battery. Relay 1116 operates in this circuit and closes a locking circuit for itself from battery, through its lower winding, and over its contact 3, contact 3 of relay 1108 to ground on conductor 1104. The operation of relay 1106 opens the operating circuit of relay 1107, but that relay is slow to release and the operation of relay 1116, at its contact 1, closes a holding circuit for relay 1107 to conductor 1104 to hold it operated.

With relay 1116 operated, a circuit is closed for identifier preference relay 501, which may be traced from battery through the winding of relay 501, conductor 502, contact 5 of relay 420, conductor 424, contact 6 of relay 1111, contact 7 of relay 1106, contact 2 of relay 1116, contact 3 of relay 1108 to ground on conductor 1104. Relay 501 operates in this circuit and locks over its contacts 3 and 5 to conductor 424 and its operating circuit, independent of gate relay 420. At its contact 5, relay 501 extends conductor 424 to the winding of relay 420, operating the latter relay.

Relay 501 represents the first preference for the number group of Fig. 9 and, when operated, opens the locking circuit of lower preference relays, in the possible event that any such relay operates at the same time. Relay 420 in operating, disconnects ground from conductors 421, 422 and 423 to indicate that the number group is associated with an identifier and also opens the operating circuits of the identifier preference relays to release operated lower preference relays and prevent their operation while the number group and identifier are associated.

In order to prevent a marker and identifier connecting with a number group at the same time, the circuit for operating the multicontact relay to make this connection is carried over contacts of the marker preference relays. Assuming that no marker is attempting to seize the number group, a circuit may be traced from ground over contact 1 of marker preference relay 301, similar contacts of intermediate marker preference relays, contact 1 of marker preference relay 311, conductor 330, contact 2 of relay 501 to battery through the winding of multicontact relay 500.

Since the marker uses the number group for only a brief interval, this arrangement permits the marker to disconnect the identifier for long enough to get the information required. Since the identifier preference relay is locked, as soon as the marker disconnects, the identifier may reoperate its multicontact relay and proceed.

With relay 500 operated to connect the identifier with the number group, a circuit is closed from ground over contact 5 of relay 500, conductor 503, to battery through the winding of relay 1117. Relay 1117 operates in this circuit and closes a circuit from ground on conductor 1104, contact 4 of relay 1116, conductor 1118, contact 2 of relay 1117, conductor 1119, contacts 8 of the eight hundred-block relays 1207 to 1200, conductor 1208, contact 2 of relay 700 to battery through the winding of relay 701. Relay 701 operates and locks over its contact 3, contact 1 of relay 715, conductor 1118, contact 4 of relay 1116 to ground on conductor 1104.

Relay 701 at its contact 5 connects ground to conductor 702 and thence over the normally closed contacts 5 of relays 1200 to 1207 to battery through the winding of relay 1209. Ground on conductor 702 also extends over contact 1 of relay 1209 to the winding of relay 1210, but the operation of relay 1209 immediately opens this circuit, preventing the effective operation of relay 1210 at this time.

With relay 1209 operated, ground on conductor 702 is extended over contact 2 of relay 1209, normally closed contacts 1, 3 and the intermediate back contacts of relay 1210, conductors 1220 to 1227, contacts 16, 17 and the intermediate contacts of the identifier connector relay 500, conductors 520 to 527, through cable 5–9A to battery through the windings of hundred-block relays 900 to 907 in the number group circuit, operating all of these relays.

Relay 701 also closes a circuit from ground, connected as above traced to conductor 1118, over contact 1 of relay 703, contact 4 of relay 701, conductor 704, in parallel to battery through the windings of relays 1300 and 1500. In addition, relay 701 connects ground over its contact 1, conductor 705, contact 3 of relay 605, contact 7 of relay 604, contact 9 of relay 603, contact 9 of relay 602, contact 9 of relay 601 to battery through the lower winding of the first twenty-block progress relay 600.

Relay 600 closes a circuit from ground at contact 4 of relay 606, contact 3 of relay 600, conductor 610, contact 14 of connector relay 500, conductor 530 through cable 5–9A to the number group circuit and over the contacts 1 of the operated hundred-block relays to battery through the windings of the first twenty-block relay associated with each hundred-block relay. Relay 910 is operated over contact 1 of relay 900 and relay 920 over contact 1 of relay 907.

With relays 910 and 920 operated, the sleeve punchings of 160 lines are tested for the identifying tone. Each punching is connected through to an individual resistance and the resistances of each twenty-block are multipled into two groups of ten each, according to whether the corresponding tens digit is odd or even. The sixteen groups of resistances are connected to the left or input windings of sixteen repeating coils as shown in Fig. 12.

Specifically, terminal 951, to which identifying tone was connected as above described, is connected over conductor 952, contact 1 of relay 910, conductor 930, contact 4 of relay 500, conductor 540 to resistance 1230 and through the left winding of repeating coil 1240 to ground.

When relay 1300 was operated, as above described, the right windings of coils 1240, 1241, etc., were connected to the input windings of the detectors of Fig. 14. Relay 1500, which operated in parallel with relay 1300, connects the output circuits from the detectors to the windings of the hundred-block register relays 1200 to 1207.

When relay 1116 was operated as above described, in response to the operation of the number group selecting relay 1111, it closed a circuit from ground on conductor 1104, contact 4 of relay 1116, conductor 1118, contact 1 of relay 1117, conductor 1120 to battery through the winding of relay 1504. When relay 1117 operates in response to the operation of the identifier connecting relay 500, this circuit is opened and relay 1504 releases closing a circuit from ground on conductor 1118 over its contact 1 to battery through the winding of relay 1505. Relay 1505 initiates a timing interval to permit the identifier circuits to be established. For this purpose, relay 1505, at its contact 5 disconnects ground from in shunt of condenser 1506, and at its contact 3 connects +130 volt battery through resistances 1507 and 1508 to condenser 1506 to cause the condenser to charge. Condenser 1506 is connected through resistance 1508 to the control anode 1509 of tube 1510. Cathode 1511 of tube 1510 is connected to ground over contact 3 of relay 1514 and contact 6 of relay 1505, while the main anode 1512 of tube 1510 is connected through the winding of relay 1513 to +130 volt battery over contact 3 of relay 1505. When the charge on condenser 1506 reaches the breakdown voltage of tube 1510 the tube becomes conducting and relay 1513 operates across the tube.

With relay 1513 operated, a circuit is closed from ground over contact 6 of relay 1505, contact of relay 1513 to battery through the winding of relay 1514. Relay 1514 operates in this circuit and locks over its contact 4 to ground over contact 6 of relay 1505. At its contact 3, relay 1514 removes ground from anode 1511 of tube 1510, quenching the tube and releasing relay 1513. At its contact 1, relay 1514 connects battery to conductor 1515 which extends in multiple to the normal contacts of relays 1420 to 1435 preparing circuits through the windings of the latter relays.

Since tone from terminal 951 flows through the left winding of repeating coil 1240, current, induced in the right winding of that coil, flows over conductors 1260 and 1261, contacts 3 and 4 of relay 1300, conductors 1316 and 1317 to detector 1400, resulting in the operation of polarized relay 1438 which connects ground to the winding of relay 1420. Relay 1420 therefore operates and locks over its contact 7 to battery.

If more than one line were marked in the group of 160 lines being tested, the associated detector relay and output relay would operate, and, due to the sequence wiring of the contacts, the higher numbered relay would have the preference.

Assuming that relay 1420 is operated alone, it closes a circuit from battery over contact 9 of relay 1500, contact 2 of relay 1501, conductor 1503, contact 8 of relay 1435, contacts 10 of relays 1428, 1427 and intermediate relays, contact 8 of relay 1420, conductor 1439, contact 3 of relay 1500, conductor 1516 to ground through the upper winding of hundred-block relay 1200. In addition, relay 1420 closes a circuit from ground at contact 1 of relay 1303, conductor 1304, contact 2 of relay 1500, conductor 1517, contact 2 of relay 1435, contacts 3 of relays 1428, 1427 and intermediate relays, contact 3 of relay 1420, conductor 1437, contact 1 of relay 1300, conductor 1305, to battery through the lower winding of relay 1212. The operation of relays 1200 and 1212 indicates that the line lies in the first or zero hundred group and in the tens subgroup having an even tens digit.

With relays 1212 and 1200 operated a locking circuit is closed from ground over contact 1 of relay 1211, upper winding and contact 1 of relay 1211, lower winding and contact 7 of relay 1200, conductor 1213, contact 2 of relay 701, to battery through the winding of relay 700. Relay 700 operates in this circuit, closing an obvious circuit for relay 703. Relay 703 operates and locks over its contact 3 to ground at contact 5 of relay 701. Relay 703 at its contact 1 disconnects ground from conductor 704, releasing relays 1300 and 1500, disconnecting the detectors from the input and output circuits causing relay 1438, relay 1420 and any other relays of the group 1420 to 1435 to release.

Relay 703 closes a circuit from battery through the winding of relay 1504, contact 2 of relay 1505, conductor 1528, contacts 1 of the units register relays 730, 735, 738 and the intermediate relays, contact 1 of relay 713, contact 2 of relay 703 to ground on conductor 1118. Relay 1504 operates in this circuit, opening the circuit of relay 1505. Relay 1504 locks over its contact 2 and contact 4 of relay 1505 to ground. When relay 1505, which is slow to release, opens its front contacts, the operating and locking circuits of relay 1504 are both opened and relay 1504 also releases.

With relay 1505 released, a circuit is closed from battery through the winding of relay 711, conductor 716, contact 1 of relay 1505, conductor 1528 and thence as above traced to ground on conductor 1118. Relay 711 operates and locks over its contact 2, contact 1 of relay 713, contact 2 of relay 703 to ground on conductor 1118. Relay 711 closes a circuit from ground over contact 1 of relay 712, contact 3 of relay 711, conductor 717, in parallel through the windings of relays 1307 and 1529 to battery. Relays 1307 and 1529 prepare the circuits by which the detectors identify the individual line, relay 1307 connecting the sleeve leads of the group of the lines in which the signal was detected during the previous identification step to separate detectors in order that the particular one of the ten lines may now be singled out as the line on which the signal appears.

When relay 1212 operates as previously described, it closes an obvious circuit for operating relay 1214. The identifier connector relay 500 connects ground to twenty conductors 550 to 569 which extend through cable 5–9A to contacts on the twenty-block relays 910, 914, etc.

As soon as identifier hundred-block relay 1200 operated as above described, it opened the circuit of relay 1209, causing that relay to release and extend ground on conductor 702 to the winding of relay 1210. Relay 1210 opens the previously traced multipled operating circuits for the hundred-block relays 900 to 907 of the number group and connects these circuits individually to contacts of relays 1200 to 1207. With relay 1200 operated, the operating circuit of relay 900, extending as above traced to conductor 1220, is further extended over contact 2 of relay 1210, contact 6 of relay 1200, to ground on conductor 702. Therefore, relay 900 is reoperated, in turn reoperating the twenty-block relay 910.

Conductors 550 to 569 are extended over contacts 11 and 12 and intermediate contacts of relay 910 to terminals 953, 954, etc., on frame 950, these terminals being associated with the twenty sleeve terminals of the twenty lines having the twenty directory numbers determined by hundred-block relay 900 and twenty-block relay 910. Terminals like terminals 953, 954, etc., are useful for indicating whether the number belongs to a tip party, a ring party (or individual line) or a P. B. X line and for that purpose are cross-connected to terminals on rack 957, there being a row of terminals on rack 957 for each such class of line.

Substation 100 is assumed to be the ring party on the line and therefore terminal 953, associated with sleeve terminal 951 individual to substation 100, is cross-connected to terminal 955 in the row of terminals on frame 957 characterizing the ring party. Terminal 955 is connected over conductor 958, contact 5 of relay 910, conductor 959 through cable 5–9A, contact 13 of relay 500, conductor 570, contact 1 of relay 1214, conductor 1215 to battery through the winding of relay 1309.

There are ten ring party relays such as relays 1308 and 1309 and ten tip party relays such as relays 1310 and 1311 and a pattern of ten of these relays is operated in accordance with the cross-connections at the number group frame, relay 1214 selecting half of the terminals marked by relay 500. The ring party relays are also operated for individual lines and P. B. X lines. Relays 1308, 1309, etc., connect the sleeve terminals of the associated lines to band-pass filters tuned to the characteristic ring party frequency of 270 cycles which are connected to the first ten detectors, while relays 1310, 1311, etc., connect the associated sleeve terminals to filters tuned to the characteristic tip party frequency of 330 cycles. Therefore, the detectors respond only if the frequency applied to the sleeve terminals is that indicated by the cross-connections on the number group frame.

Sleeve terminal 951, to which 270-cycle current was connected as described, is connected over conductor 952, contact 1 of relay 910, conductor 930 through cable 5–9A, contact 4 of relay 500, conductor 540, contact 1 of relay 1207, contact 7 of relay 1214, conductor 1216, condenser 1314, resistance 1315, contact 1 of relay 1307, contact 1 of relay 1309 to 270-cycle filter 1313 which is connected over conductors 1316 and 1317 to detector 1400. Therefore, relay 1438 operates to supply ground to the winding of relay 1420.

When relay 1504 releases as above described, relay 1505 reoperates to initiate the operation of the test timing circuit. When relay 1514 operates in response to this timing operation, it connects battery over its contact 1 to the windings of relays 1420 to 1435 as previously described and relay 1420 operates and locks to battery over its contact 7.

With relay 1420 operated, a circuit is closed from battery over contact 7 of relay 1529, contact 2 of relay 1502, conductor 1503, contact 8 of relay 1435, contacts 10 of relays 1428, 1427 and the intermediate relays, contact 8 of relay 1420, conductor 1439, contact 1 of relay 1529, conductor 1530 to ground through the upper winding of relay 1318 and to ground through the left winding of relay 730. Relays 1318 and 730 operate and lock in a circuit from ground through the lower winding and over contact 3 of relay 1318, conductor 1319, right winding and contact 4 of relay 730, contact 1 of relay 711, to battery through the winding of relay 710. Relay 730 registers the units digit of the line designation and with relay 710, closes a circuit from battery through the winding of relay 712, contact of relay 710, contact 2 of relay 730, contacts 1 of relays 735, 739 and the intermediate relays, contact 1 of relay 713, contact 2 of relay 703 to ground on conductor 1118. Relay 712 operates and locks under the control of relay 711.

The identification process is now complete. Relays 730 to 739 contain the units digit, relays 600 to 604 in combination with relays 1211 and 1212 contain the tens digit, while relays 900 to 907 in the number group are wired to supply the hundreds and thousands digits, which are transmitted over the conductors of cable 5–9B, contacts of relay 500, contacts of relay 1210 and the conductors of cable 12–15 to the registers indicated at 1531.

With relay 712 operated a circuit is closed from ground on conductor 1118, contact 3 of relay 712, contact 6 of relay 730, conductor 718 to battery through the winding of relay 1532 to prepare for the transfer of the line designation to a recorder.

A circuit also extends from ground, connected to conductor 718 as above traced, contact 1 of relay 1121 to battery through the winding of relay 1122. Relay 1122 operates to indicate that a number has been identified and at its contact 2 closes a locking circuit for start relay 1101 independent of the common start relay 1100. At its contact 4, relay 1122 connects ground to conductor 1120 to operate relay 1504 and disable the timing circuits. In addition it closes a circuit for initiating the connection of the identifier with the sender at which the identifying tone originated. This circuit may be traced from battery through resistance 1123, contact 2 of relay 1124, contact 3 of relay 1122, conductor 1125 through cable 2–11 to ground through the winding of relay 220, individual to this identifier in the identifier lock-out chain of Fig. 2.

This identifier lock-out chain including relays 220, 221 and 222, each individual to an identifier, permits only one identifier to search for a sender at a time. Relay 220, being the first relay of the chain can operate but, if some other identifier has already seized the lock-out chain, relay 220 does not become effective until the lock-out relay of the other identifier is released.

With relay 220 operated alone, a circuit is closed from 1000-cycle current, through resistance 223, contact 1 of relay 222, contact 1 of relay 221 and the corresponding contacts of intermediate relays of the chain, contact 1 of relay 220, conductor 224 through cable 2–11 to the identifier, contact 1 of relay 1122, conductor 1126 to ground through the right winding of repeating coil 1320. This tone is repeated into a circuit which may be traced from ground over contact 2 of relay 1307, contact 2 of relay 1318, left winding of repeating coil 1320, and thence, over the circuit used in identifying the line, over contact 1 of relay 1318, contact 1 of relay 1307, resistance 1315, condenser 1314, conductor 1216, contact 7 of relay 1214, contact 1 of relay 1200, conductor 540, contact 4 of relay 500, conductor 930, contact 1 of relay 910, conductor 952, terminal 951, conductor 119, over the sleeve contact of the line which has been identified, through switches 103 and 104, resistance 110, contact 3 of relay 108, contact 1 of relay 112, contact 3 of relay 109, switches 114 and 115, conductor 118, contact 2 of relay 214, through the trunk connector 204, middle winding of hybrid coil 253 in the sender 205 to ground. This 1000-cycle current is transmitted through the lower winding of hybrid coil 253, 1000-cycle filter 225, amplifier 226 and rectifier 227 to the winding of relay 217, operating that relay.

Relay 217 closes a circuit from battery over its contact to ground through the winding of relay 218. Relay 218 operates and locks over its contact 3, contact of relay 216, to battery over contact 2 of relay 210. At its contact 1, relay 218 disconnects the identifying tone from the hybrid coil and at its contact 2 opens the circuit of relay 214, thereby opening the circuit of the common start relay 1100. If no other line is awaiting identification, relay 1100 releases, in turn releasing the start relays of the other identifiers and restoring them to normal.

Relay 217 also closes a circuit from battery over its contact, contact 1 of relay 228, to ground through the winding of relay 229 individual to this sender. With relays 220 and 229 operated, a circuit is closed from battery over contact 5 of relay 222, contact 6 of relay 221 and similar contacts of intermediate chain relays, contact 4 of relay 220, contact 3 of relay 229, winding of relay 230 to ground. Relay 230 serves to connect sender 205 with the identifier shown in detail. Relay 230 extends its operating battery over its contact 2 to ground through the winding of relay 228. Relay 228 operates and locks over its contact 2, contact 3 of relay 218, contact of relay 216 to battery at the contact of relay 210 and at its contact 1 opens the circuit of relay 229.

Relay 230 also connects ground over its contact 1, conductor 233 through cable 2–11 to battery through the winding of relay 1124. Relay 1124 operates to indicate that the sender has been found and locks through the winding of relay 1121 to ground on conductor 1118 but relay 1121 does not operate, being shunted by the operating circuit of relay 1124. At its contact 2, relay 1124 disconnects battery from the winding of relay 220, releasing relay 220 and permitting other identifiers to enter the lock-out circuit. With relay 220 released, the 1000-cycle current is disconnected and relay 217 releases.

With relay 230 operated, the line designation is set up on the calling line number register 208 of the sender, the plurality of circuits for so doing being indicated by circuits closed over contacts 3 and 4 of relay 230, and conductors 234 and 235 through cable 2-11. A set of ten circuits is provided for each of the four digits, one conductor of each set being grounded by the identifier. Relay 1532 connects the four sets of conductors through to the identifier, the two sets of conductors representing the thousands and hundreds digits being marked by the register 1531, which was operated from the hundred-block relay of the number group as previously described. The tens digit conductors are marked over contacts of the twenty-block progress relay 600 to 604 and of the odd and even tens relays 1211 and 1212. Since it was assumed that relays 1212 and 600 were operated, ground is connected over contact 3 of relay 1212, conductor 1217, contact 1 of relay 600, conductor 620, contact 3 of relay 1532 to conductor 1533. The units digit conductors are grounded over contacts of the units relays 730 to 739. Since relay 730 was assumed to be operated, ground on conductor 1118 is extended over contact 3 of relay 730, conductor 720, contact 1 of relay 1532 to conductor 235.

When the registration has been completed, relay 216 is operated in the sender, releasing relays 218, 228 and 230, disconnecting the identifier from the sender. With relay 230 released, ground is removed from conductor 233, permitting relay 1121 to operate in the locking circuit of relay 1124. Relay 1121 at its contact 1 opens the circuit of relay 1122 and that relay releases. The release of relay 1122 opens the locking circuit of relay 1101 which also releases, removing ground from conductor 1104 and thereby from conductor 1118 to restore the identifier to normal.

However, if other calls are awaiting identification, the common start relay 1100 is held operated and in turn holds relay 1101 operated which holds relay 1121 operated. In that case, the release of relay 1122 closes a circuit from ground on conductor 1104, contact 5 of relay 1122, contact 2 of relay 1121, to battery through the winding of relay 1108.

Relay 1108 operates in this circuit and at its contact 3 opens the locking circuit of relay 1116 causing that relay to release and disconnect ground from conductor 1118, thereby releasing relays 1124 and 1121. At its contact 1, relay 1108 opens the shunt around the winding of relay 1105, permitting that relay to operate. The operation of relay 1105 opens the circuit of relay 1107 which releases slowly. Relay 1108 closes a temporary locking circuit for itself over contact 2 of relay 1107 and contact 2 of relay 1108 to ground on conductor 1104, to insure that relay 1107 release. When relay 1107 has released, relay 1108 releases.

Since relays 1105 and 1106 are now both operated, a circuit is closed for reoperating relay 1107 from battery through the winding of that relay over contact 5 of relay 1106 and contact 3 of relay 1105 to ground on conductor 1104. With relay 1107 operated and relay 1108 released, ground on conductor 1104 is connected over contact 1 of relay 1108, contact 1 of relay 1107, contact 2 of relay 1105 to battery through resistance 1109 in shunt of the winding of relay 1106, causing the latter relay to release. Relay 1105 is held operated over the normal contact 3 of relay 1106, contact 1 of relay 1107, contact 1 of relay 1108 to ground on conductor 1104.

With relay 1106 released, a circuit is closed from ground on conductor 1104, contact 1 of relay 1106, contact 1 of relay 1111 to battery through the winding of the next number group select relay 1112. Relay 1112 operates and locks over its contact 3 and contact 4 of the next relay of the chain to ground on conductor 1104. At its contact 4, relay 1112 opens the locking circuit of relay 1111 causing the latter relay to release.

With relay 1105 and relay 1112 operated, the circuit of relay 1116 is extended to the conductor, corresponding to conductor 423, leading to the next number group preference circuit. If that circuit is available, the gate relay will be normal and relay 1116 operates, after which the test proceeds as for the first number group. If some other identifier is hunting in this number group, the gate relay will be operated and relay 1116 will fail to operate. Therefore, after an interval, relay 1107 will release and open the holding circuit of relay 1105. With relays 1105 and 1106 both released, relay 1107 reoperates, reoperating relay 1106 to operate the next number group select relay. In this manner, an identifier is enabled to skip number group circuits which are being used by other identifiers.

If the identified line had not been found among the first group of lines tested, none of the relays 1420 to 1435 would have been operated and relays 1300 and 1500 remain operated. In this case, the operation of relay 1514 connects +130 volt battery over its contact 2 to the winding of relay 1518 and through resistances 1519 and 1520 to condenser 1521. With relay 1505 operated, ground is removed from in shunt of condenser 1521 so that the condenser now charges.

Condenser 1521 is connected through resistance 1520 to the control anode 1523 of tube 1522, relay 1518 is connected to the main anode of tube 1522 and ground is connected over contact 6 of relay 1505 and contact 2 of relay 1526 to the cathode of tube 1522. When condenser 1521 receives a sufficient charge, tube 1522 becomes conducting and relay 1518 operates, in turn operating relay 1526 which locks over its contact 3 to ground at contact 6 of relay 1505.

Therefore, if no line is found in the first group tested, relay 1526 operates after a measured additional interval, closing a circuit from ground over its contact 1, conductor 1527, contact 11 of relay 1300, conductor 1306 to battery through the winding of relay 606. Relay 606, at its contact 1, connects ground to conductor 1120, operating relay 1504 which locks over its contact 2 under the control of relay 1505 and at its contact 1 opens the circuit of relay 1505 which releases slowly. With relay 1505 released the timing circuits are restored to normal.

In addition, relay 606 at its contact 4 opens the circuit of the twenty-block relays 910, 920, etc. in the number group and at its contact 2 connects ground over contact 1 of relay 605, contact 6 of relay 600 to battery through the lower winding of relay 601. Relay 601 operates and locks over its contact 8, contacts 9 of relays 602 and 603, contact 7 of relay 604, contact 3 of relay 605, conductor 705 to ground at contact 1 of relay 701. Relay 601 opens the operating circuit of relay 600, but that relay is held operated in a circuit from battery through its upper winding and contact 5, contact 5 of relay 605 to ground at contact 3 of relay 606.

When relay 1505 releases, in turn releasing relay 1526, relay 606 is also released in turn releasing relay 600. With relay 606 released, ground is connected over contact 4 of relay 606 and contact 3 of relay 601 to conductor 611 to operate the next set of twenty-block relays and bring about the test of the second group of lines. If the identified line does not appear in the second group, relay 606 is again operated under the control of timing tube 1522 and the test thus progresses until all of the lines in the number group have been tested for the presence of identifying tone.

If no identifying tone has been detected, when relay 606 operates, following the operation of the last twenty-block selecting relay 604 and the release of relay 603, a circuit is closed from ground over contact 2 of relay 606, contact 1 of relay 605, contact 7 of relay 600, contacts 11 of relays 601, 602 and 603, conductor 615 to battery through the winding of relay 1108. Relay 1108 functions as above described to cause the identifier to hunt for the line in the next number group.

Since the two parties on a party line will have different directory numbers, the sleeve contact of the party line is connected to two terminals on number group frames. The two parties are distinguished for identification by means of the party identification circuit 207 of the sender, where relay 211 is operated when a tip party is calling and is normal for the ring party and for all other lines. As above described, with relay 211 normal the identification tone is one of 270 cycles supplied by source 251. If a tip party is calling and relay 211 is operated, the identification tone is supplied from source 254 having a frequency of 330 cycles. During the twenty-block test no discrimination is made between the two frequencies, and it is therefore possible that the identifier may identify the twenty-block including the non-calling party's terminal.

Therefore, when the units test is made, the frequency received will not pass the filter selected by way of the class punching on the number group frame, none of the relays 1420 to 1435 or 730 to 739 will be operated. Therefore, the timing tube 1522 will be permitted to function, operating relay 1526. With relay 1529 operated for making units identification, the operation of relay 1526 closes a circuit from ground over its contact 1, conductor 1527, contact 6 of relay 1529, conductor 1534 to battery through the winding of relay 713. Relay 713 locks over its contact 2 and conductor 721 to ground at contact 5 of relay 1529 and also to ground over contact 4 of relay 703 and contact 5 of relay 701. Relay 713 closes a circuit from ground on conductor 1118, contact 3 of relay 713, contact 1 of relay 714 to battery through the winding of relay 715. Relay 715 operates and locks in a circuit from battery through its winding, winding of relay 714, contact 2 of relay 715 to ground on conductor 1118, but relay 714 cannot operate, being shunted by the operating circuit of relay 715. Relay 715 at its contact 1 opens the locking circuit of relay 701 which thereupon releases, in turn opening the locking circuit for the hundred-block and odd and even tens registration relays and relay 700. Relay 703 is held operated temporarily over its contacts 3 and 4 and conductor 721 to ground at contact 5 of relay 1529. Relay 713 also opens the operating and locking circuits of relay 711 which releases, in turn releasing relays 1307 and 1529. The release of relays 1307 and 1529 disconnects the detectors and returns them to normal. With relays 1529 and 701 released, relays 703 and 713 release. The release of relay 713 permits relay 714 to operate in the locking circuit of relay 715.

With relay 715 operated ground on conductor 1118 is connected over contact 3 of relay 715 to conductor 722, operating relays 605, 1501 and 1502. With these relays operated, the order in which the identifier hunts over the hundred-blocks and over the twenty-blocks is reversed.

When the hundred-block relays 1200 to 1207 are all released relay 701 is reoperated and, with relay 605 operated closes a circuit from ground over its contact 1, conductor 705, contact 4 of relay 605, contact 4 of relay 600, contacts 6 of relay 601 to 603, to battery through the winding of relay 604 so that the twenty-block relays 914, 924, etc. are operated first. If relay 606 is operated to advance to another twenty-block, it closes a circuit over its contact 2, contact 2 of relay 605, contact 5 of relay 604 to battery through the upper winding of relay 603 so that the test progresses in the reverse direction.

With relays 1500 and 1501 operated the circuit for operating the hundred-block register relay extends from battery over contact 9 of relay 1500, contact 1 of relay 1501 and conductor 1535 to the armature of relay 1420 to give preference to that relay. Similarly, with relay 1529 operated for the units test, battery is connected over contact 7 of relay 1529 and contact 1 of relay 1502 to conductor 1535 to give preference to relay 1420. It may be noted that cross-connections are provided in the wiring of relays 1501, 1502 and 605 so that they may be either operated or released on the first trial and released or operated for the second trial.

These cross-connections will be arranged so that different identifiers will start searching within a particular number group at different points and hence, although one identifier may be prevented from reaching a particular signal as a result of two other calls to different parties in this number group, some other identifier will eventually reach this number group and find the desired signal.

If, during the second trial, a signal is found on the twenty-block test but none on the units test, relay 713 is again operated. With relay 714 operated to indicate a second trial, the operation of relay 713 closes a circuit from ground on conductor 1118, contact 3 of relay 713, contact 2 of relay 714 to conductor 615 to operate relay 1108 and advance the identifier to another number group.

When a marker operates its preference relay such as relay 311 to seize a number group, the circuit of the identifier connector relays such as relay 500 is opened, thereby releasing relay 1117 in the identifier. With relay 1117 released, ground on conductor 1118 is connected over contact 1 of relay 1117 to conductor 1120 to operate relay 1504, which releases relay 1505 and stops the timing operations which are in progress. The identifier then awaits release of the number group by the marker, after which relays 500 and 1117 reoperate, relay 1504 releases and the timing operation is repeated and the identification is completed. Relays 501 and 420 are held operated so that any other identifiers seeking a signal will pass by this number group.

What is claimed is:

1. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line, and thereby to mark the cross-connected terminal on a number group frame, a plurality of identifiers common to said senders, means in each identifier to seize said number group frames one at a time and to test the terminals on said number group frame for said marking, cross-connections in said identifiers to cause each of said identifiers to initially seize a different number group frame, means in each identifier to start said identifier to hunt for said marked terminal, common start means, means under the control of the marking means of any sender to operate said common start means, means under the control of said common start means to operate the start means of all of said identifiers, and means operated responsive to the testing of said marked terminal by one of said identifiers to hold the start means of said one identifier and to release said common start means and thereby to release the other identifiers.

2. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line and thereby to mark the cross-connected terminal on a number group frame, a plurality of line identifiers common to said senders, means in each line identifier to seize said number group frames one at a time and to test the terminals on said number group frame for said marking, cross-connections in said line identifiers to cause each line identifier to initially seize a different number group frame, means in each line identifier to start said line identifier to hunt for said marked terminal, common start means, means under the control of the marking means of any sender to operate said common start means, means under the control of said common start means to operate the start means of all of said line identifiers, a sender identifier common to said senders, means operated responsive to the testing of said marked terminal by one of said line identifiers to operate said sender identifier to identify the sender which marked said terminal and means operated responsive to the operation of said sender identifier to hold the start means of said one line identifier and to release said common start means and thereby to release the other line identifiers.

3. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line and thereby to mark the cross-connected terminal on a number group frame, a plurality of line identifiers common to said senders, means in each line identifier to seize said number group frames one at a time and to test the terminals on said number group frame for said marking, cross-connections in said line identifiers to cause each line identifier to initially seize a different number group frame, means in each line identifier to start said line identifier to hunt for said marked terminal, common start means, means under the control of the marking means of any sender to operate said common start means, means under the control of said common start means to operate the start means of all of said line identifiers, a sender identifier common to said senders, means operated responsive to the testing of said marked terminal by one of said line identifiers to identify the sender which marked said terminal by transmitting a signal from said line identifier over said number group terminal to said sender to operate said sender identifier and means operated responsive to the operation of said sender identifier to hold the start means of said one line identifier and to release said common start means and thereby to release the other line identifiers.

4. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line and thereby to mark the cross-connected terminal on a number group frame, by transmitting an alternating current of one frequency over said connection, a plurality of line identifiers common to said senders, means in each line identifier to seize said number group frames one at a time and to test the terminals on said number group frame for said marking, cross-connections in said line identifiers to cause each line identifier to initially seize a different number group frame, means in each line identifier to start said line identifier to hunt for said marked terminal, common start means, means under the control of the marking means of any sender to operate said common start means, means under the control of said common start means to operate the start means of all of said line identifiers, a sender identifier common to said senders, means operated responsive to the testing of said marked terminal by one of said line identifiers to identify the sender which marked said terminal by transmitting an alternating current of a different frequency from said line identifier over said number group terminal to said sender to operate said sender identifier and means operated responsive to the operation of said sender identifier to hold the start means of said one line identifier and to release said common start means and thereby to release the other line identifiers.

5. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line, and thereby to mark the cross-connected terminal on a number group frame, a plurality of identifiers common to said senders, means in each identifier to seize said number group frames one at a time and to test the terminals on said number group frame for said marking, cross-connections in said identifiers to cause each identifier to initially seize a different number group frame, means in each identifier to start said identifier to hunt for said marked terminal, common start means, means under the control of the marking means of any sender to operate said common start means, means under the control of said common start means to operate the start means of all of said identifiers, a sender-identifier connector including a relay individual to each identifier and each sender, means operated responsive to the testing of said marked terminal by one of said identifiers to operate the relay individual to said one identifier in said connector, other means operated responsive to the testing of said marked terminal to transmit a signal from said identifier over said marked terminal to said sender to operate the relay individual to said sender in said connector and means under the joint control of said individual identifier relay and said individual sender relay to connect said one identifier with said one sender.

6. In a telephone system, subscriber lines having numerical designations, automatic switches, said lines having non-numerical appearances on said switches, each appearance including an individual sleeve terminal, outgoing trunks, register senders, means including said switches for connecting a calling one of said lines with one of said trunks and one of said senders, a plurality of number group frames, terminals on said frames individual to numerical designations, said numerical designation terminals being cross-connected to the sleeve terminals individual to the lines having the corresponding designations, means in said one sender to mark the sleeve terminal of said one line, and thereby to mark the cross-connected terminal on a number group frame, a plurality of identifiers common to said senders, means in each identifier to seize said number group frames one at a time and to test the terminals on said number group frame for said marking, cross-connections in said identifiers to cause each identifier to initially seize a different number group frame, means in each identifier to start said identifier to hunt for said marked terminal, common start means, means under the control of the marking means of any sender to operate said common start means, means under the control of said common start means to operate the start means of all of said identifiers, a sender-identifier connector including a relay individual to each identifier and each sender, means operated responsive to the testing of said marked terminal by one of said identifiers to operate the relay individual to said one identifier in said connector, other means operated responsive to the testing of said marked terminal to transmit a signal from said identifier over said marked terminal to said sender to operate the relay individual to said sender in said connector, means under the joint control of said individual identifier relay and said individual sender relay to connect said one identifier with said one sender, means in said identifier operated during the hunt for said marked terminal to register the identity of said one line and means operated responsive to the connection of said one identifier with said one sender to transfer said registered line identity to said sender.

7. In a telephone system, subscriber lines, a plurality of substations connected to said lines, each substation having a numerical designation, automatic switches, said lines having non-numerical appearances on said switches, each appearance including an individual sleeve terminal, outgoing trunks, register senders, means including said switches for connecting a line, having a calling substation thereon, with one of said trunks and one of said senders, a plurality of number group frames, terminals on said frames individual to numerical designations, said numerical designation terminals being cross-connected to the sleeve terminals individual to the lines to which the substations having the corresponding designations are connected, means in said one sender to test said one line to determine the calling substation on said line, means operated by said substation test means to transmit a signal over said connection characteristic of said calling substation to mark the sleeve terminal of said one line and thereby to mark the cross-connected terminals on one or more number group frames, a plurality of identifiers common to said senders, means in each identifier to seize said number group frames one at a time, means to test the terminals on a seized number group frame for said marking, and means individual to each number group terminal, effective when said number group terminal is tested, to operate means in said identifier to render said testing means responsive only to the signal characteristic of the substation having the designation to which the number group terminal is individual.

8. In a telephone system, subscriber lines having numerical designations, automatic switches, said lines having non-numerical appearances on said switches, each appearance including an individual sleeve terminal, outgoing trunks, register senders, means including said switches for establishing simultaneous individual connections between a plurality of calling lines, a plurality of said trunks and a plurality of said senders, a plurality of number group frames, terminals on said frames individual to numerical designations, said numerical designation terminals being cross-connected to the sleeve terminals individual to the lines having the corresponding designations, means in each of said senders to mark the sleeve terminal of the line connected therewith, and thereby to mark the cross-connected terminals on a number group frame, a plurality of identifiers, means in each identifier to seize said number group frames one at a time and to test the terminals on said number group frames for said marking, means in each identifier to start said identifier to hunt for said marked terminals, common start means, means under the control of the marking means of any sender to operate said common start means, means under the control of said common start means to operate the start means of all of said identifiers, and cross-connections in said identifiers to cause each of said identifiers to initially seize a different number group frame to provide a minimum hunting operation for each identifier.

9. In a telephone system, subscriber lines having numerical designations, automatic switches, said lines having non-numerical appearances on said switches, each appearance including an individual sleeve terminal, outgoing trunks, register senders, means including said switches for establishing simultaneous individual connections between a plurality of calling lines, a plurality of said trunks and a plurality of said senders, a plurality of number group frames, terminals on said frames individual to numerical designations, said numerical designation terminals being cross-connected to the sleeve terminals individual to the lines having the corresponding designations, means in each of said senders to mark the sleeve terminal of the line connected therewith, and thereby to mark the cross-connected terminal on a number group frame, a plurality of line identifiers common to said senders, means in each line identifier to seize said number group frames one at a time and to test the terminals on said number group frames for said marking, means in each line identifier to start said line identifier to hunt for said marked terminals, common start means, means under the control of the marking means of any sender to operate said common start means, means under the control of said common start means to operate the start means of all of said line identifiers, cross-connections in said line identifiers to cause each of said line identifiers to initially seize a different number group frame to provide a minimum hunting operation for each line identifier, a sender identifier common to said senders, means responsive to the testing of a marked terminal by each of said line identifiers to operate said sender identifier to identify the sender which marked said terminal, a sender-identifier connector, means responsive to the operation of said sender identifier to operate said sender-identifier connector to connect the line identifier which tested the marked terminal with the sender which marked the terminal, means in each of said line identifiers operated during the hunt for a marked terminal to register the identity of the line corresponding to said marked terminal and means responsive to the connection of a line identifier with a sender to transfer said registered line identity from the line identifier to the connected sender.

10. In a telephone system, subscriber lines, a plurality of substations connected to said lines, each substation having a numerical designation, automatic switches, said lines having non-numerical appearances on said switches, each appearance including an individual sleeve terminal, outgoing trunks, register senders, means including said switches for connecting a line, having a calling substation thereon, with one of said trunks and one of said senders, a plurality of number group frames, terminals on said frames individual to numerical designations, said numerical designation terminals being cross-connected to the sleeve terminals individual to the lines to which the substations having the corresponding designations are connected, means in said one sender to test said one line to determine the calling substation on said line, means operated by said substation test means to transmit a signal over said connection characteristic of said calling substation to mark the sleeve terminal of said one line and thereby to mark the cross-connected terminals on one or more number group frames, a plurality of identifiers, means in each identifier to seize said number group frames one at a time, means to test the terminals on a seized number group frame for said marking, means individual to each number group terminal effective when said number group terminal is tested, to operate means in the identifier to render said testing means responsive only to the signal characteristic of the substation having the designation to which the number group terminal is individual, preference chain circuits for controlling the order of testing said terminals on a number group, means for reversing said preference chain circuits and cross-connecting means for arbitrarily operating said reversing means in certain identifiers.

11. In a telephone system, subscriber lines, a plurality of substations connected to said lines, each substation having a numerical designation, automatic switches, said lines having non-numerical appearances on said switches, each appearance including an individual sleeve terminal, outgoing trunks, register senders, means including said switches for connecting a line, having a calling substation thereon, with one of said trunks and one of said senders, a plurality of number group frames, terminals on said frames individual to numerical designations, said numerical designation terminals being cross-connected to the sleeve terminals individual to the lines to which the substations having the corresponding designations are connected, means in said one sender to test said one line to determine the calling substation on said line, means operated by said substation test means to transmit a signal over said connection characteristic of said calling substation to mark the sleeve terminal of said one line and thereby to mark the cross-connected terminals on one or more number group frames, a plurality of identifiers, means in each identifier to seize said number group frames one at a time, means to test the terminals on a seized number group frame for said marking, means individual to each number group terminal effective when said number group terminal is tested, to operate means in the identifier to render said testing means responsive only to the signal characteristic of the substation having the designation to which the number group terminal is individual, preference chain circuits for controlling the order of testing said terminals on a number group, means for reversing said preference chain circuits, cross-connecting means for arbitrarily operating said reversing means in certain identifiers, and means responsive to a partial failure of said testing means to operate or release said reversing means and cause said identifier to retest said terminals in the reverse order.

12. In a telephone system, subscriber lines, a plurality of substations connected to said lines, each substation having a numerical designation, automatic switches, said lines having non-numerical appearances on said switches, each appearance including an individual sleeve terminal, outgoing trunks, register senders, means including said switches for connecting a line, having a calling substation thereon, with one of said trunks and one of said senders, a plurality of number group frames, terminals on said frames individual to numerical designations, said numerical designation terminals being cross-connected to the sleeve terminals individual to the lines to which the substations having the corresponding designations are connected, a plurality of signals, each characteristic of one of said plurality of substations, means in said one sender to test said one line to determine the calling substation on said line, means operated by said substation test means to transmit over said connection the signal characteristic of said calling substation to mark the sleeve terminal of said one line and thereby to mark the cross-connected terminals on one or more number group frames, a plurality of identifiers, means in each identifier to seize said number group frames one at a time, means for testing said terminals in groups for any one of said characteristic signals, individual testing means, means responsive to the testing of a group of terminals including a marked terminal to initiate the operation of said individual testing means, means individual to each number group terminal effective when said number group terminal is tested, to operate means in the identifier to render said individual testing means responsive only to the signal characteristic of the substation having the designation to which the number group terminal is individual, preference chain circuits for said group testing means and said individual testing means, means for reversing the order of preference in said chain circuits, and means responsive to the failure of said individual testing means to find a marked terminal to operate said reversing means and to cause said identifier to retest said terminal groups and said terminals in the reverse order.

References Cited in the file of this patent

UNITED STATES PATENTS

| Number    | Name   | Date           |
|-----------|--------|----------------|
| 2,084,105 | Myers  | June 15, 1937  |
| 2,265,844 | Korn   | Dec. 9, 1941   |
| 2,426,981 | Blake  | Sept. 9, 1947  |
| 2,535,512 | Ostline| Dec. 26, 1950  |